US010993245B2

United States Patent
Uchiyama

(10) Patent No.: US 10,993,245 B2
(45) Date of Patent: Apr. 27, 2021

(54) TERMINAL APPARATUS, BASE STATION, METHOD, AND RECORDING MEDIUM

(71) Applicant: SONY CORPORATION, Tokyo (JP)

(72) Inventor: Hiromasa Uchiyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/479,021

(22) PCT Filed: Dec. 15, 2017

(86) PCT No.: PCT/JP2017/045064
§ 371 (c)(1),
(2) Date: Jul. 18, 2019

(87) PCT Pub. No.: WO2018/142785
PCT Pub. Date: Aug. 9, 2018

(65) Prior Publication Data
US 2019/0349952 A1 Nov. 14, 2019

(30) Foreign Application Priority Data
Feb. 3, 2017 (JP) .............................. JP2017-018437

(51) Int. Cl.
*H04W 72/10* (2009.01)
*H04W 4/40* (2018.01)
(Continued)

(52) U.S. Cl.
CPC .............. *H04W 72/10* (2013.01); *H04W 4/40* (2018.02); *H04W 72/06* (2013.01); *H04W 72/1247* (2013.01); *H04W 76/27* (2018.02)

(58) Field of Classification Search
CPC ....... H04W 72/10; H04W 4/40; H04W 76/27; H04W 72/06; H04W 72/1247;
(Continued)

(56) References Cited

U.S. PATENT DOCUMENTS

| 2015/0382324 A1* | 12/2015 | Sheng | H04W 72/02 370/329 |
| 2016/0131740 A1* | 5/2016 | Yoo | G01S 7/4004 342/70 |

(Continued)

FOREIGN PATENT DOCUMENTS

| CN | 106060947 A | 10/2016 |
| CN | 106416405 A | 2/2017 |

(Continued)

OTHER PUBLICATIONS

Masmoudi, Ahlem, et al. "Efficient scheduling and resource allocation for D2D-based LTE-V2X communications." 2019 15th International Wireless Communications & Mobile Computing Conference (IWCMC). IEEE, 2019. (Year: 2019).*

(Continued)

*Primary Examiner* — Sharad Rampuria
(74) *Attorney, Agent, or Firm* — Chip Law Group

(57) ABSTRACT

Provided is a mechanism capable of allowing signals transmitted by use of different communication methods classified as V2X communication to appropriately coexist in a resource pool. A terminal apparatus for performing communication using any of communication methods classified as vehicle to X (V2X) communication, the terminal apparatus including: an acquisition unit that acquires allocation information regarding allocation of a first resource pool and setting information regarding priority use of the first resource pool, the first resource pool being available to a plurality of terminal apparatuses using the different communication methods classified as V2X communication; and a transmission processing unit that performs a process of packet transmission using the first resource pool on the basis of the communication method of the terminal apparatus
(Continued)

itself, the allocation information, and the setting information regarding priority use.

20 Claims, 15 Drawing Sheets

(51) Int. Cl.
*H04W 76/27* (2018.01)
*H04W 72/06* (2009.01)
*H04W 72/12* (2009.01)

(58) Field of Classification Search
CPC ......... H04W 4/44; H04W 4/46; H04W 72/04; H04W 92/18; H04W 72/12; H04W 76/00; G08G 1/09; H04B 7/2121; H04B 7/2123; H04J 2203/0069; H04Q 2213/394
See application file for complete search history.

(56) References Cited

U.S. PATENT DOCUMENTS

| | | |
|---|---|---|
| 2018/0063852 A1 | 3/2018 | Kang et al. |
| 2018/0255558 A1* | 9/2018 | Lee ................ H04W 72/10 |
| 2019/0268915 A1 | 8/2019 | Li et al. |

FOREIGN PATENT DOCUMENTS

| | | |
|---|---|---|
| EP | 3162141 A1 | 5/2017 |
| EP | 3487247 A1 | 5/2019 |
| JP | 2017-523666 A | 8/2017 |
| KR | 10-2016-0131740 A | 11/2016 |
| WO | 2015/200607 A1 | 12/2015 |
| WO | 2016/182256 A1 | 11/2016 |
| WO | 2017/014514 A1 | 1/2017 |
| WO | 2018/010649 A1 | 1/2018 |

OTHER PUBLICATIONS

"PC5 for V2P", 3GPP TSG-RAN WG1 #86, Gothenburg, Sweden, R1-166266, Aug. 22-26, 2016, 03 pages.
"Evaluation and Discussion on Resource Selection for Pedestrian UEs", 3GPP TSG RAN WG1 Meeting No. 86, Gothenburg, Sweden, R1-167886, Aug. 22-26, 2016, pp. 1-6.
"Consideration on Pool Management and Resource Selection", 3GPP TSG-RAN WG2 Meeting No. 96, Reno, USA, R2-168085, Nov. 14-18, 2016, pp. 1-4.
"Discussion on V2P Aspects", 3GPP TSG-RAN WG2 Meeting No. 96, Reno, USA, R2-168144, Nov. 14-18, 2016, 05 pages.
Extended European Search Report of EP Application No. 17895271.9, dated Dec. 20, 2019, 07 pages.
International Search Report and Written Opinion of PCT Application No. PCT/JP2017/045064, dated Mar. 6, 2018, 09 pages of ISRWO.
"Discussion on V2P Aspects", 3GPP TSG-RAN WG2 Meeting #96, Reno, USA, R2-168144, Nov. 14-18, 2016, 05 pages.
"Consideration on Pool Management and Resource Selection", 3GPP TSG-RAN WG2 Meeting #96, Reno, USA, R2-168085, Nov. 14-18, 2016, pp. 1-4.
"PC5 for V2P", Qualcomm Incorporated, 3GPP TSG-RAN WG1, 86th meeting, Gothenburg, Sweden, Aug. 22-26, 2016, 03 pages.
"Evaluation and discussion on resource selection for pedestrian UEs", NTT Docomo, Inc., 3GPP TSG-RAN WG1, 86th meeting, Gothenburg, Sweden, Aug. 22-26, 2016, 06 pages.

* cited by examiner

FIG. 1
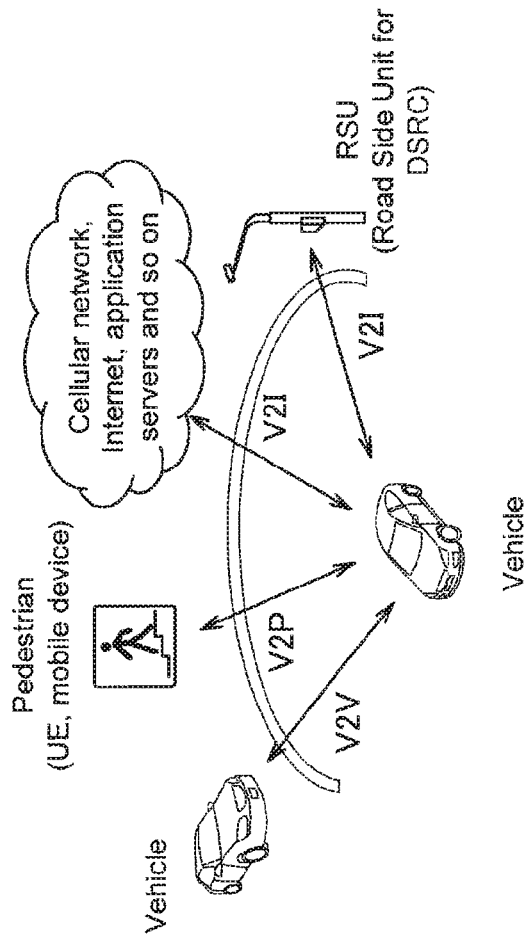
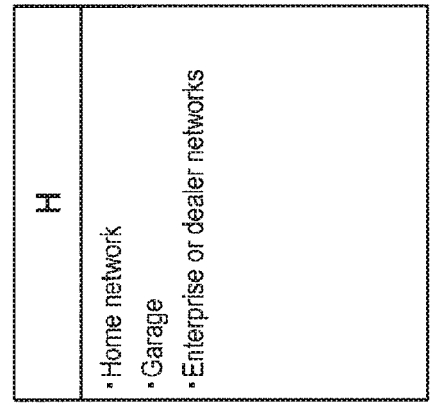
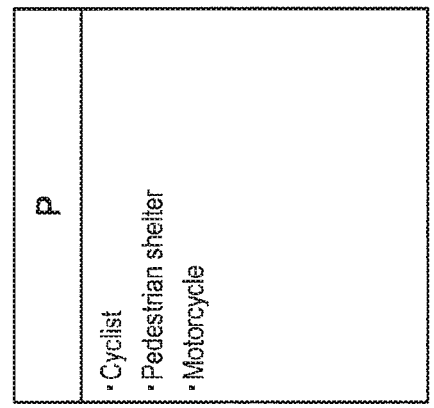
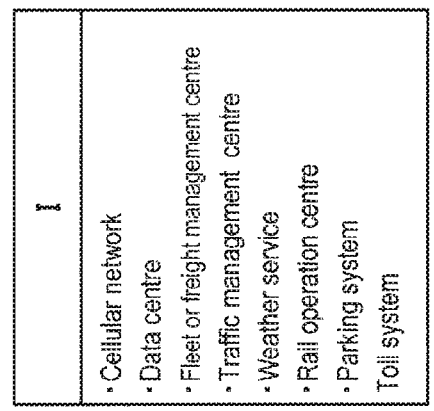
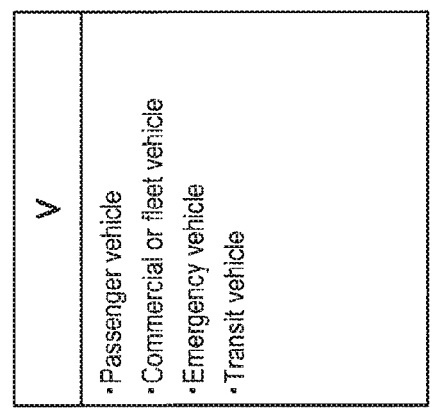

TERMINAL APPARATUS, BASE STATION, METHOD, AND RECORDING MEDIUM

CROSS REFERENCE TO RELATED APPLICATIONS

This application is a U.S. National Phase of International Patent Application No. PCT/JP2017/045064 filed on Dec. 15, 2017, which claims priority benefit of Japanese Patent Application No. JP 2017-018437 filed in the Japan Patent Office on Feb. 3, 2017. Each of the above-referenced applications is hereby incorporated herein by reference in its entirety.

TECHNICAL FIELD

The present disclosure relates to a terminal apparatus, a base station, a method, and a recording medium.

BACKGROUND ART

Direct communication between a mobile object, such as a vehicle, and various objects is implemented by use of a communication apparatus mounted on the mobile object. Communication between a communication apparatus mounted on a mobile object and various other communication apparatuses is referred to as vehicle to X (V2X) communication. With regard to V2X communication, communication systems using dedicated short range communication (DSRC) have been discussed thus far. Meanwhile, in recent years, communication systems using cellular communication standards such as Long Term Evolution (LTE) are under discussion.

For example, Non-Patent Documents 1 and 2 below disclose techniques related to resource pools that can be shared by terminals that perform V2X communication using the cellular communication standards. According to such techniques, a resource pool can be shared by, for example, a vehicular UE and a pedestrian UE.

CITATION LIST

Non-Patent Document

Non-Patent Document 1: Qualcomm Incorporated, "PC5 for V2P," R1-166266, 3GPP TSG-RAN WG1 #86, 22-26 Aug. 2016, Gothenburg, Sweden
Non-Patent Document 2: NTT DOCOMO, INC., "Evaluation and discussion on resource selection for pedestrian UEs," R1-167886, 3GPP TSG RAN WG1 Meeting #86, 22-26 Aug. 2016, Gothenburg, Sweden

SUMMARY OF THE INVENTION

Problems to be Solved by the Invention

There is a plurality of communication methods classified as V2X communication. Examples thereof include V2V communication for communication between vehicular UEs, and V2P communication for communication between a vehicular UE and a pedestrian UE. Here, V2V communication and V2P communication are different in parameters such as packet transmission cycles. Therefore, in a case where a resource pool is used in common for V2V communication and V2P communication, various adverse effects may be caused by differences in parameters.

Thus, the present disclosure provides a mechanism capable of allowing signals transmitted by use of different communication methods classified as V2X communication to appropriately coexist in a resource pool.

Solutions to Problems

According to the present disclosure, there is provided a terminal apparatus for performing communication using any of communication methods classified as V2X communication, the terminal apparatus including: an acquisition unit that acquires allocation information regarding allocation of a first resource pool and setting information regarding priority use of the first resource pool, the first resource pool being available to a plurality of terminal apparatuses using the different communication methods classified as V2X communication; and a transmission processing unit that performs a process of packet transmission using the first resource pool on the basis of the communication method of the terminal apparatus itself, the allocation information, and the setting information regarding priority use.

Furthermore, according to the present disclosure, there is provided a base station including: a control unit that notifies a terminal apparatus that performs communication using any of communication methods classified as V2X communication, of allocation information regarding allocation of a first resource pool and setting information regarding priority use of the first resource pool, the first resource pool being available to a plurality of terminal apparatuses using the different communication methods classified as V2X communication.

Moreover, according to the present disclosure, there is provided a method to be performed by a terminal apparatus that performs communication using any of communication methods classified as V2X communication, the method including: acquiring allocation information regarding allocation of a first resource pool and setting information regarding priority use of the first resource pool, the first resource pool being available to a plurality of terminal apparatuses using the different communication methods classified as V2X communication; and performing a process of packet transmission using the first resource pool on the basis of the communication method of the terminal apparatus itself, the allocation information, and the setting information regarding priority use.

In addition, according to the present disclosure, there is provided a method including: notifying, by use of a processor, a terminal apparatus that performs communication using any of communication methods classified as V2X communication, of allocation information regarding allocation of a first resource pool and setting information regarding priority use of the first resource pool, the first resource pool being available to a plurality of terminal apparatuses using the different communication methods classified as V2X communication.

Furthermore, according to the present disclosure, there is provided a recording medium on which a program has been recorded, the program causing a computer of a terminal apparatus that performs communication using any of communication methods classified as V2X communication to function as: an acquisition unit that acquires allocation information regarding allocation of a first resource pool and setting information regarding priority use of the first resource pool, the first resource pool being available to a plurality of terminal apparatuses using the different communication methods classified as V2X communication; and a transmission processing unit that performs a process of packet transmission using the first resource pool on the basis of the communication method of the terminal apparatus itself, the allocation information, and the setting information regarding priority use.

Moreover, according to the present disclosure, there is provided a recording medium on which a program has been recorded, the program causing a computer to function as: a control unit that notifies a terminal apparatus that performs communication using any of communication methods classified as V2X communication, of allocation information regarding allocation of a first resource pool and setting information regarding priority use of the first resource pool, the first resource pool being available to a plurality of terminal apparatuses using the different communication methods classified as V2X communication.

According to the present disclosure, the terminal apparatus performs a process of packet transmission by using the first resource pool that is available to a plurality of terminal apparatuses using different communication methods classified as V2X communication, on the basis of the setting information regarding priority use of the first resource pool. Thus, it is possible to cause a resource to be preferentially used for communication by an appropriate one of a plurality of terminal apparatuses using different communication methods.

Effects of the Invention

As described above, according to the present disclosure, there is provided a mechanism capable of allowing signals transmitted by use of different communication methods classified as V2X communication to appropriately coexist in a resource pool. Note that the above-described effect is not necessarily restrictive, and any of the effects set forth in the present specification or another effect that can be derived from the present specification may be achieved together with or instead of the above-described effect.

BRIEF DESCRIPTION OF DRAWINGS

FIG. 1 is an explanatory diagram for describing an overview of V2X communication.

MODE FOR CARRYING OUT THE INVENTION

Figure 2:
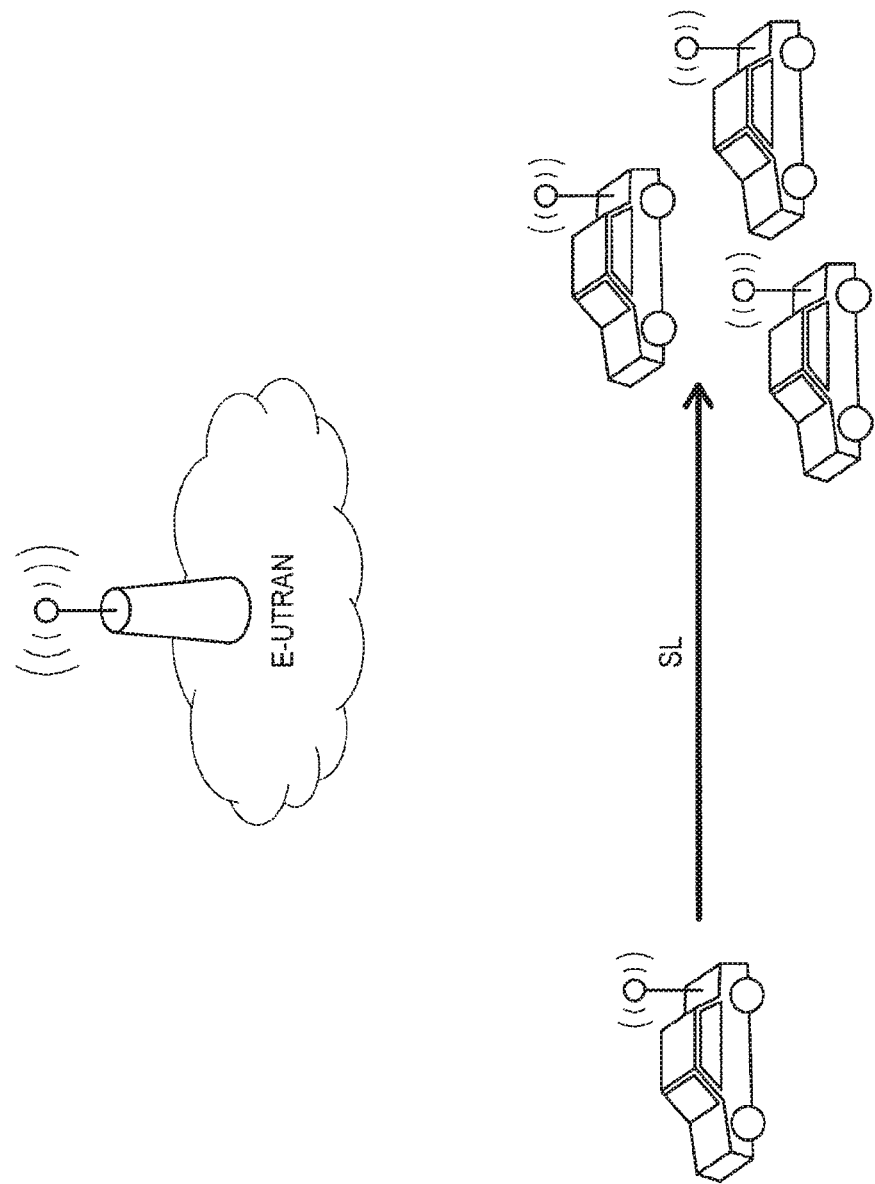
FIG. 2 is an explanatory diagram for describing a first scenario of V2V communication.

A preferred embodiment of the present disclosure will be described in detail below with reference to the accompanying drawings. Note that in the present specification and the drawings, the same reference numerals are assigned to constituent elements having substantially the same functional configurations, and redundant description will be thus omitted.

Note that description will be provided in the following order.

1. Introduction
1.1. V2X Communication
1.2. Sharing of Resource Pool
2. Configuration Examples
2.1. Example of System Configuration
2.2. Example of Configuration of Base Station
2.3. Example of Configuration of Terminal Apparatus
3. Technical Features
3.1. Flow of Processing
3.2. Information regarding Communication Status of SideLink
3.3. Resource Pool Allocation
3.4. Priority Control
3.5. Transmission Process
4. Applications
5. Conclusion 1. Introduction <1.1. V2X Communication>

Direct communication between a mobile object, such as a vehicle, and various objects is implemented by use of a communication apparatus mounted on the mobile object. Communication between a vehicle and various objects is referred to as vehicle to X (V2X) communication. FIG. 1 is an explanatory diagram for describing an overview of V2X communication. As shown in FIG. 1, examples of V2X communication include vehicle to vehicle (V2V) communication, vehicle to infrastructure (V2I) communication, vehicle to pedestrian (V2P) communication, and vehicle to home (V2H) communication. In addition, although not shown, examples of V2X communication also include vehicle to nomadic device (V2N) communication. Here, first and third characters in the term "V2V communication" and the like indicate a starting point and an ending point, respectively, and are not intended to limit a communication path. For example, V2V communication is a concept including direct communication between mobile objects and indirect communication via a base station or the like.

As shown in FIG. 1, examples of objects with which a vehicle communicates by use of V2V communication include a passenger vehicle, a commercial or fleet vehicle, an emergency vehicle, and a transit vehicle. Furthermore, examples of objects with which a vehicle communicates by use of V2I communication include a cellular network, a data centre, a fleet or freight management centre, a traffic management centre, a weather service, a rail operation centre, a parking system, and a toll system. Moreover, examples of objects with which a vehicle communicates by use of V2P communication include a cyclist, a pedestrian shelter, and a motorcycle. In addition, examples of objects with which a vehicle communicates by use of V2H communication include a home network, a garage, and enterprise or deeler networks.

Note that with regard to V2X communication, communication systems using dedicated short range communication (DSRC) have been discussed, while communication systems using cellular phone communication standards such as Long Term Evolution (LTE) are under discussion in recent years. Note that V2X communication is not limited to communication using LTE, and can also be implemented in 5G that is currently under discussion. In other words, the technology according to an embodiment of the present disclosure is not limited to LTE-based V2X communication, and is also applicable to 5G. As a matter of course, the present technology is also applicable to any other communication standards.

Examples of application of V2X communication include a communication system intended for forward collision warning, out-of-control warning, emergency vehicle warning, emergency stop, adaptive cruise assist, traffic condition warning, traffic safety, automatic parking, route deviation warning, message transmission, collision warning, communication range expansion, traffic volume adjustment, curve speed warning, pedestrian collision warning, vulnerable people safety, or the like. Besides, the following is currently under discussion: V2X communication to be performed by a road side unit (RSU) type user equipment (UE), the minimum QoS of V2X communication, V2X access in a case of roaming, provision of messages for pedestrians on road safety via V2P communication, mixed use for traffic management, improvement of position measurement accuracy for traffic participants, or the like.

A list of requirements for the above application is shown in Table 1 below.

to V2I communication or V2N. Such an interface between a base station and a terminal is also referred to as a Uu interface. In future studies, it is required to extend the PC5 interface and the Uu interface in such a way as to meet the above requirements. Examples of main extension points include improvement of resource allocation, measures to deal with the Doppler frequency, establishment of a synchronization method, implementation of low-power consumption communication, implementation of low-delay communication, and the like.

There are various possible operation scenarios of V2X communication. For instance, examples of operation scenarios of V2V communication will be described with reference to FIGS. 2 to 6.

FIG. 2 is an explanatory diagram for describing a first scenario of V2V communication. In the first scenario, mobile objects such as vehicles directly perform V2V communication with each other. A communication link in this case is also referred to as SideLink (SL).

Figure 3:
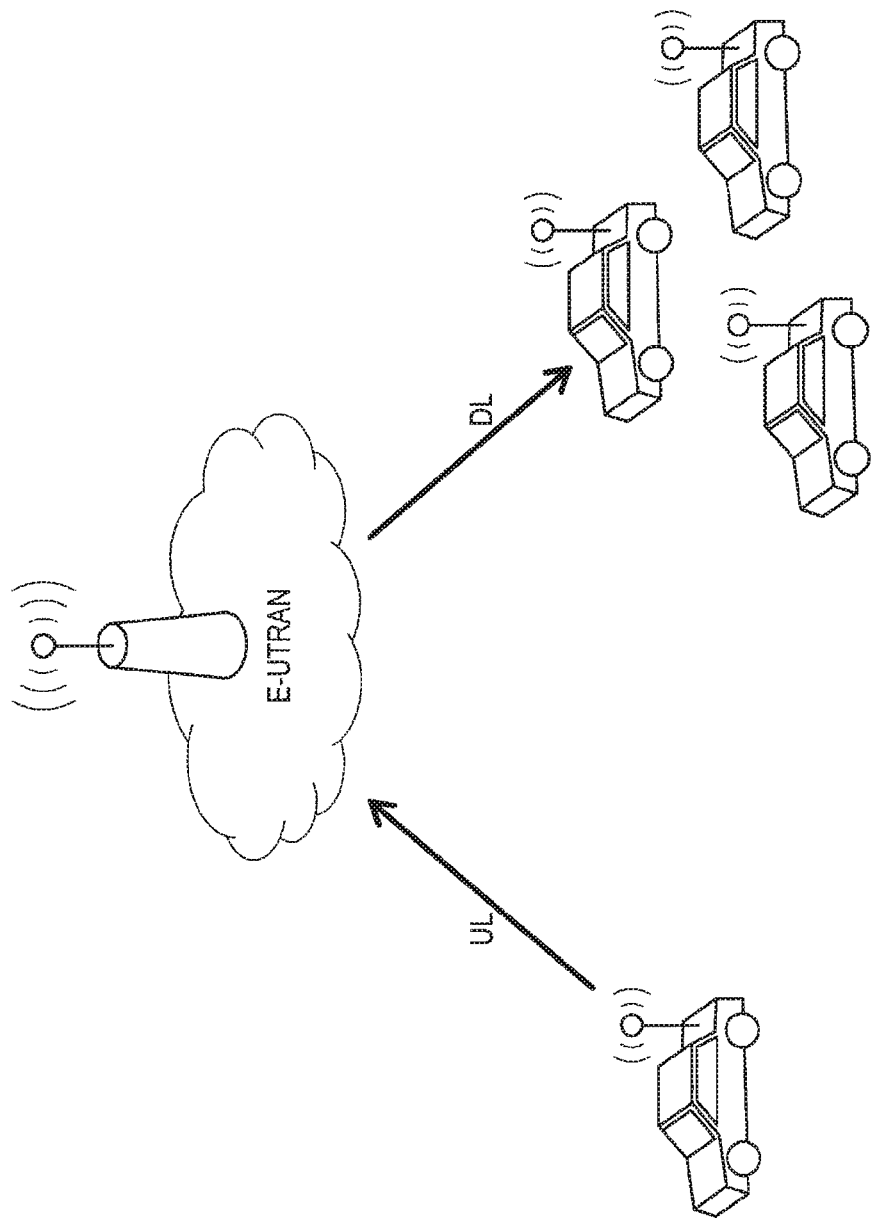
FIG. 3 is an explanatory diagram for describing a second scenario of V2V communication.

FIG. 3 is an explanatory diagram for describing a second scenario of V2V communication. In the second scenario, mobile objects such as vehicles indirectly perform V2V communication with each other via Evolved Universal Terrestrial Radio Access (E-UTRAN), that is, via a base station. A communication link from a transmitting side to the base station is also referred to as an uplink (UL). A communication link from the base station to a receiving side is also referred to as a downlink (DL).

Figure 4:
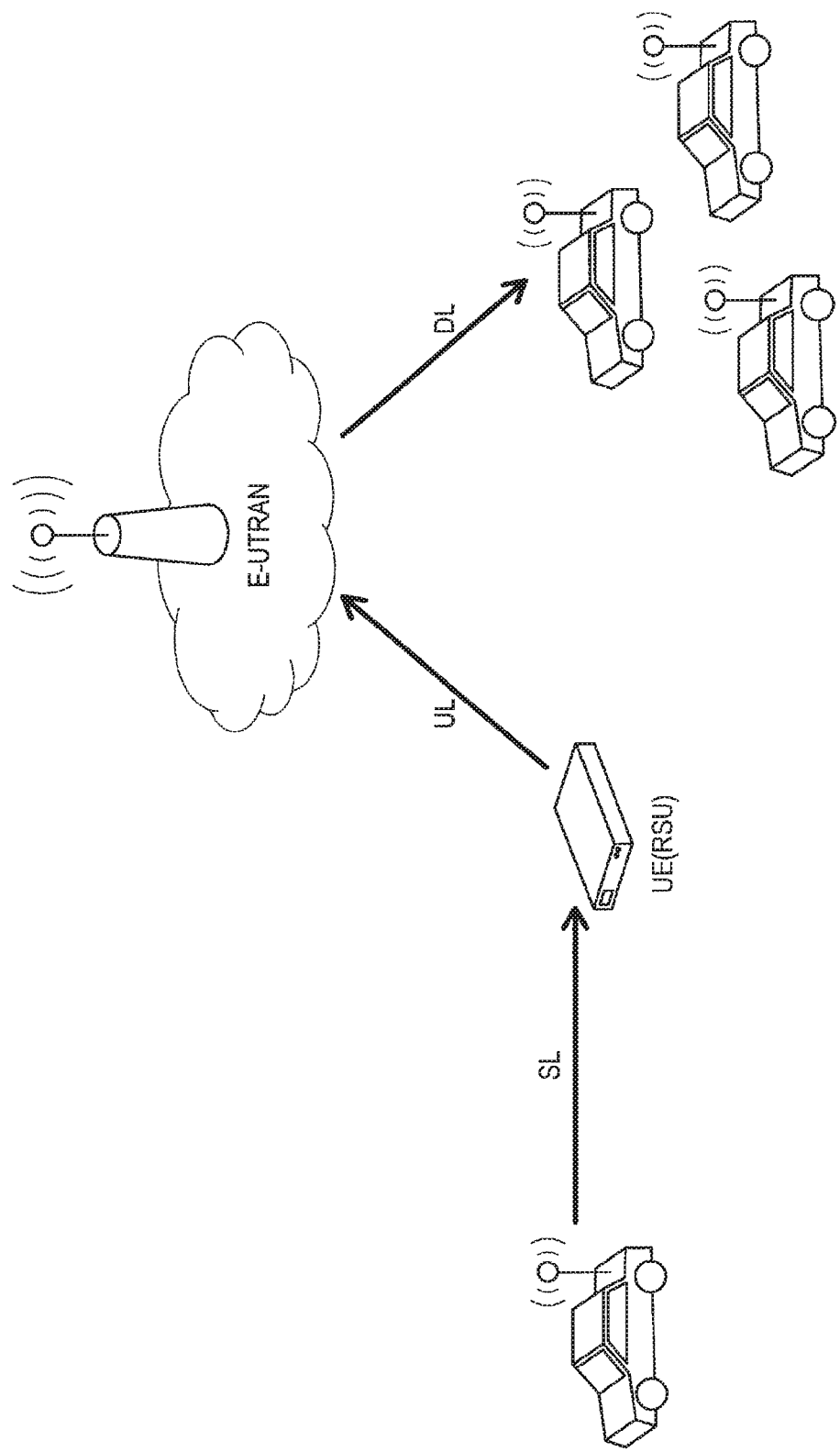
FIG. 4 is an explanatory diagram for describing a third scenario of V2V communication.

FIG. 4 is an explanatory diagram for describing a third scenario of V2V communication. In the third scenario, a mobile object, such as a vehicle, transmits a signal to another mobile object via an RSU or RSU-type UE, and E-UTRAN in sequence. Communication links between the apparatuses are, in order, the SL, UL, and DL.

Figure 5:
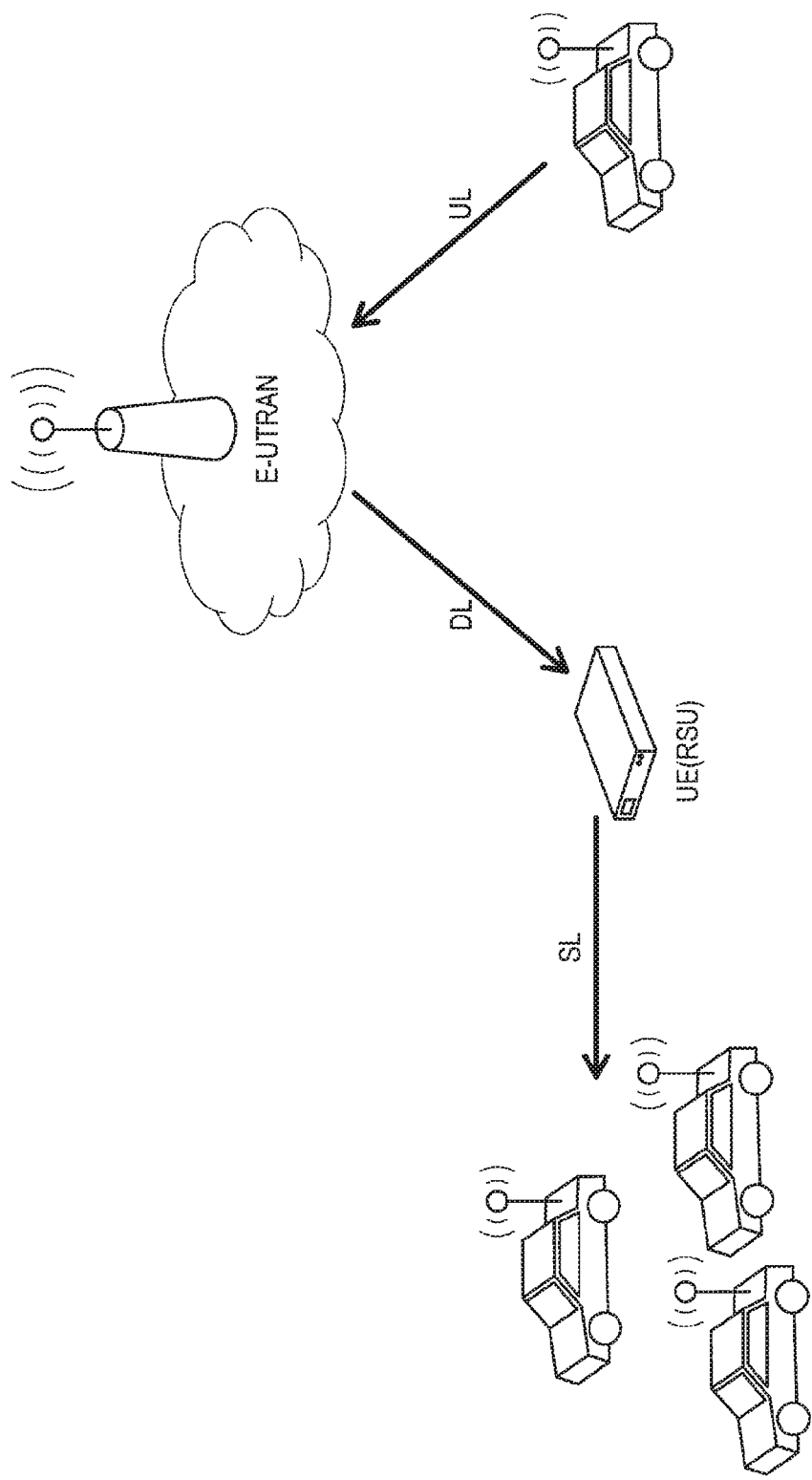
FIG. 5 is an explanatory diagram for describing a fourth scenario of V2V communication.

FIG. 5 is an explanatory diagram for describing a fourth scenario of V2V communication. In the fourth scenario, a mobile object, such as a vehicle, transmits a signal to another mobile object via E-UTRAN and an RSU or RSU-type UE

TABLE 1

| | Effective range | Absolute velocity of UE for supporting V2X service | Relative velocity between two UEs for supporting V2X service | Maximum acceptable waiting time | Reliability of minimum wireless layer message reception (probability of reception by receiver within 100 milliseconds) | Example of reliability of cumulative transmission |
|---|---|---|---|---|---|---|
| #1 Suburbs | 200 m | 50 kmph | 100 kmph | 100 ms | 90% | 99% |
| #2 Major road | 320 m | 160 kmph | 280 kmph | 100 ms | 80% | 96% |
| #3 Expressway | 320 m | 280 kmph | 280 kmph | 100 ms | 80% | 96% |
| #4 Urban area | 150 m | 50 kmph | 100 kmph | 100 ms | 90% | 99% |
| #5 Intersection in urban area | 50 m | 50 kmph | 100 kmph | 100 ms | 95% | — |
| #6 Campus/commercial area | 50 m | 30 kmph | 30 kmph | 100 ms | 90% | 99% |

In order to meet the above requirements, standardization of the physical layer of V2X communication is under discussion in 3GPP. Device to device (D2D) communication standardized by 3GPP in the past can be cited as the base technology of V2X communication. D2D communication is terminal-to-terminal communication to be performed without involving a base station. Therefore, it can be said that D2D communication is suitable for extension to V2V communication, V2P communication, or some types of V2I communication. Such an interface between terminals is also referred to as a PC5 interface. Meanwhile, extension of existing technology, such as LTE, for communication between a base station and a terminal is assumed with regard in sequence. Communication links between the apparatuses are, in order, the UL, DL and SL.

Figure 6:
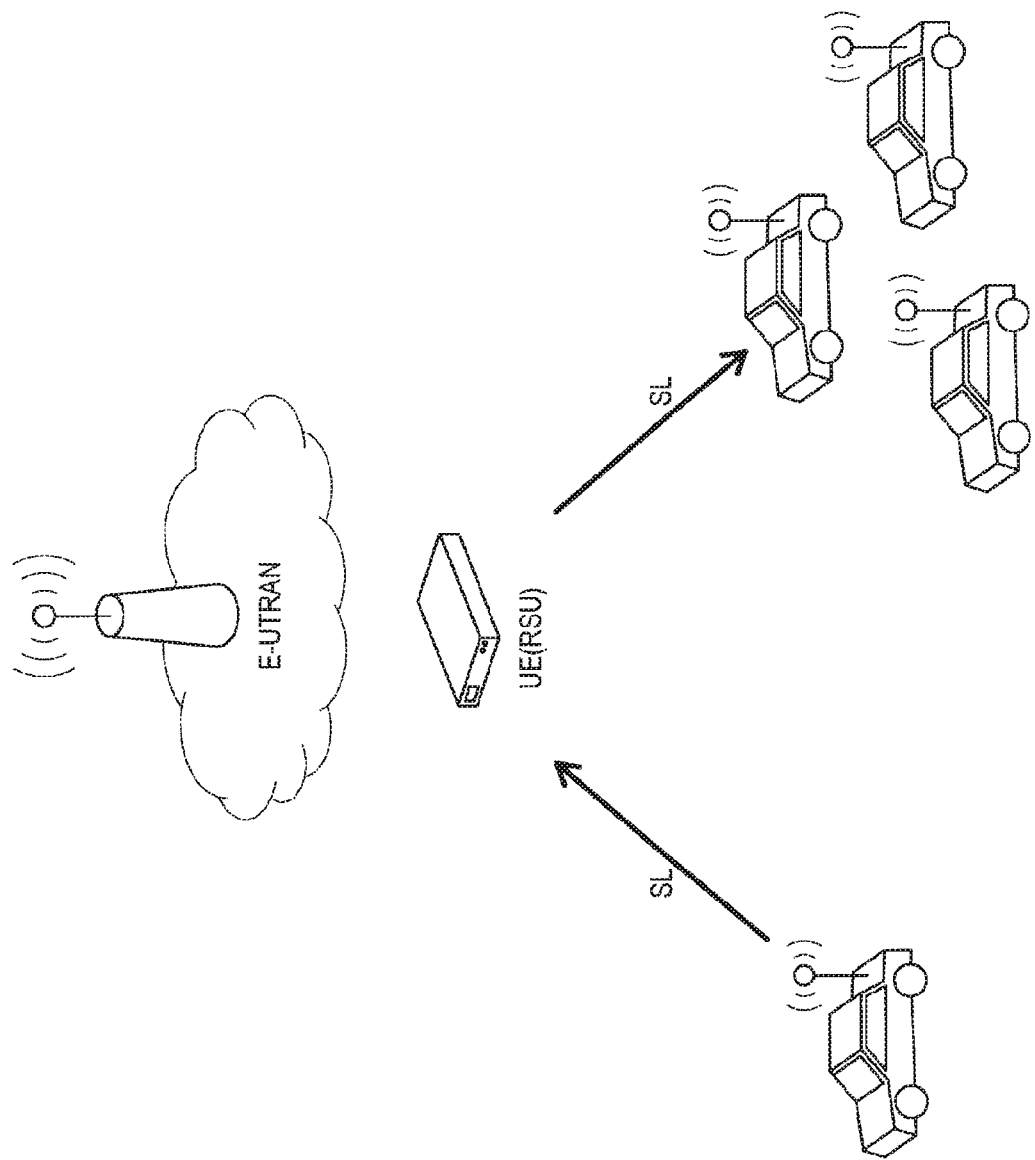
FIG. 6 is an explanatory diagram for describing a fifth scenario of V2V communication.

FIG. 6 is an explanatory diagram for describing a fifth scenario of V2V communication. In the fifth scenario, mobile objects such as vehicles indirectly perform V2V communication with each other via an RSU or RSU-type UE. A communication link between each mobile object and the RSU or RSU-type UE is the SL.

Each of the above-described scenarios becomes a scenario of V2P communication if one of the mobile objects is changed to a pedestrian. Similarly, if one of the mobile objects is changed to an infrastructure or network, each of the scenarios becomes a scenario of V2I communication or V2N communication, respectively.

In V2P communication, a communication apparatus mounted on a mobile object communicates with a communication apparatus carried by a pedestrian. Examples of requirements in V2P communication will be described below. A delay requirement includes a delay within 500 ms from a server to a terminal and an end-to-end delay within 100 ms. An operation requirement includes multi-mobile network operator (MNO) support. A power consumption requirement includes minimization of battery consumption. A coverage requirement includes covering a range in which V2P communication can be performed 4 or more seconds before a collision. For example, if the speed is 100 km/h, coverage with a radius equal to or larger than 27.7 m/s×4 s, that is, approximately 110.8 m is required. A message requirement includes typically 50 to 300 bytes, up to 1200 bytes. A communication quality requirement includes establishing communication in an environment in which the relative velocity between a motorcycle and a car is 280 km/h and the relative velocity between a pedestrian and a car is 160 km/h.

<1.2. Sharing of Resource Pool>

Figure 7:
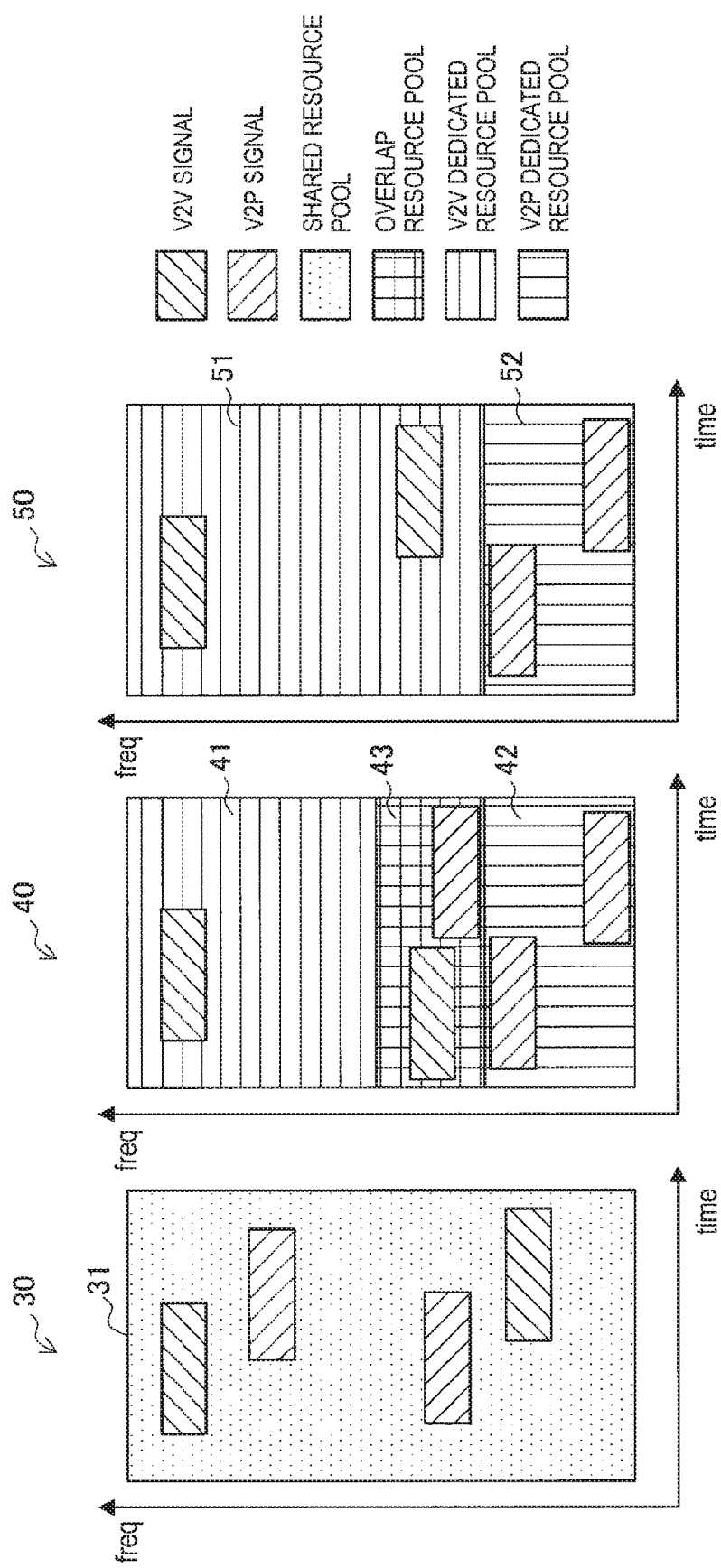
FIG. 7 is a diagram for describing examples of sharing a resource pool.

There is a plurality of communication methods classified as V2X communication. A resource pool is shared for different communication methods in some cases. Hereinafter, examples of sharing a resource pool between V2V communication and V2P communication will be described with reference to FIG. 7. FIG. 7 is a diagram for describing examples of sharing a resource pool.

There is a plurality of possible cases of sharing a frequency resource between V2P communication and V2V communication. For example, there may be a case of setting a resource pool that can be used in common by both V2P communication and V2V communication, and a case of setting a V2P dedicated resource pool and a V2V dedicated resource pool. Hereinafter, the former is also referred to as a shared case and the latter is also referred to as a dedicated case.

Reference numerals 30, 40, and 50 in FIG. 7 show setting examples of resource pools, where the vertical axes represent frequency and the horizontal axes represent time. An example denoted by reference numeral 50 in FIG. 7 is a setting example of a resource pool in the dedicated case. In the dedicated case, a frequency resource is set such that the frequency resource is separated into a V2V dedicated resource pool 51 and a V2P dedicated resource pool 52. The V2V dedicated resource pool 51 is used for signals using V2V communication (hereinafter also referred to as V2V signals). The V2P dedicated resource pool 52 is used for signals using V2P communication (hereinafter also referred to as V2P signals). Therefore, in the dedicated case, it is possible to prevent V2P signals from interfering with V2V signals and prevent V2V signals from interfering with V2P signals. However, resources for V2V signals and resources for V2P signals are separated in the dedicated case. Therefore, the dedicated case is not desirable in terms of efficient use of frequency.

Meanwhile, it is possible to achieve efficient use of frequency resources in the shared case. Therefore, it is desirable to provide a mechanism for allowing V2P communication and V2V communication to appropriately coexist in the shared case.

In an example denoted by reference numeral 30 in FIG. 7, the entire frequency resource is set as a shared resource pool 31. The shared resource pool 31 can be used in common by both V2P communication and V2V communication, and is used for V2P signals and V2V signals.

In an example denoted by reference numeral 40 in FIG. 7, a frequency resource is set such that the frequency resource is separated into a V2V dedicated resource pool 41, a V2P dedicated resource pool 42, and an overlap resource pool 43. The overlap resource pool 43 can be used in common by both V2P communication and V2V communication, and is used for V2P signals and V2V signals. Thus, there may also be a case where, while dedicated resource pools are set for V2V communication and V2P communication, parts of the dedicated resource pools overlap with each other, and are shared.

Priority control can be cited as one of issues in the shared case. Typically, a transmission cycle in V2P communication is longer than that in V2V communication. For example, it is assumed that while V2V communication has a cycle of 100 ms, V2P communication has a cycle of 1000 ms or the like. Thus, V2P communication provides less transmission opportunity than V2V communication. Therefore, it is desirable to perform control such that, for example, priority given to V2P communication is higher than that of V2V communication. Accordingly, proposed below is a mechanism for priority control in the shared case.

2. Configuration Examples

<2.1. Example of System Configuration>

Figure 8:
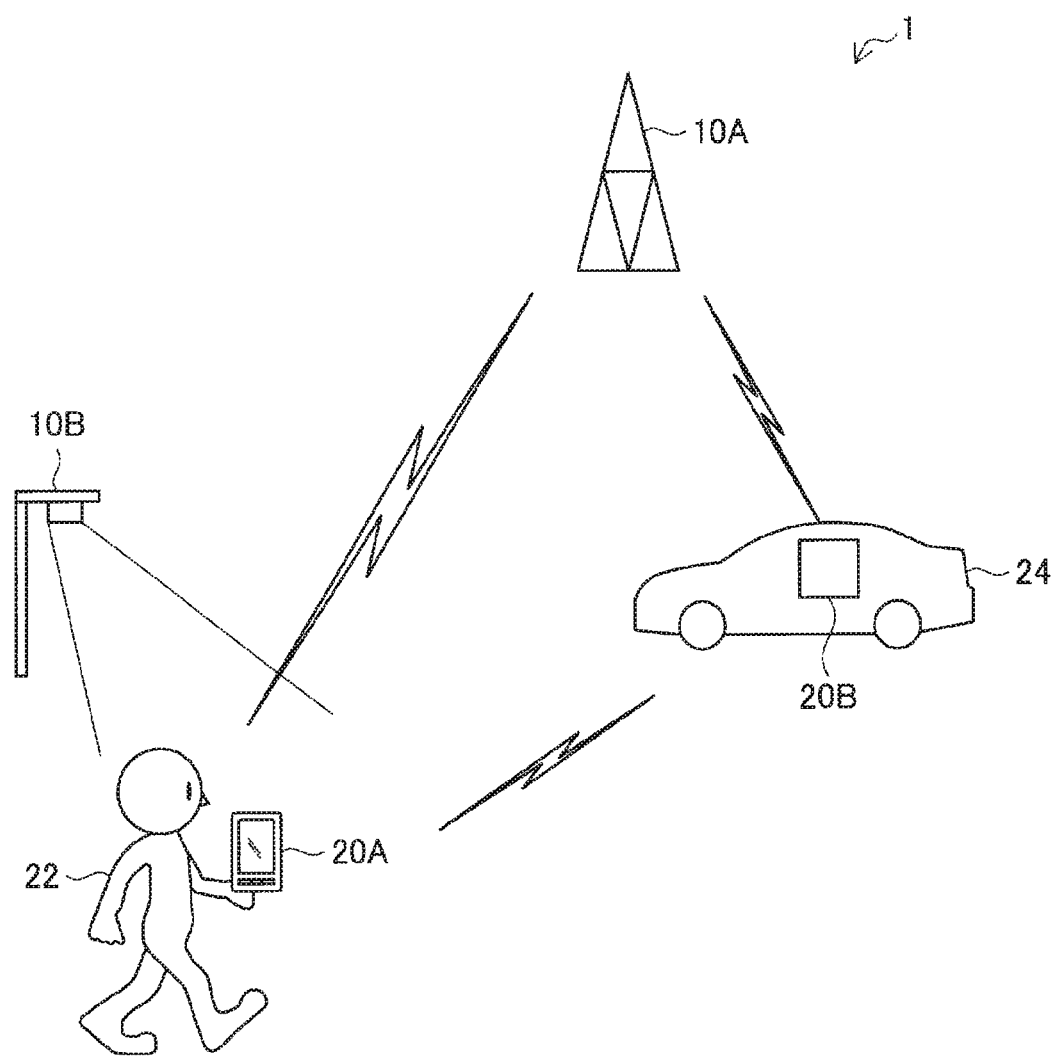
FIG. 8 is an explanatory diagram showing a configuration of a system according to an embodiment of the present disclosure.

FIG. 8 is an explanatory diagram showing a configuration of a system according to the embodiment of the present disclosure. As shown in FIG. 8, a system 1 according to the embodiment of the present disclosure includes a base station 10A, an RSU 10B, a terminal apparatus 20A, and a terminal apparatus 20B.

The base station 10A is a cellular base station that provides cellular communication service to terminal apparatuses located in a cell. For example, the base station 10A schedules a resource for the terminal apparatuses 20A and 20B to perform communication, and notifies the terminal apparatuses 20A and 20B of the scheduled resource. Then, the base station 10A performs uplink communication or downlink communication with the terminal apparatuses 20A and 20B on the resource.

The RSU 10B is a communication apparatus installed at the side of a road. The RSU 10B can perform two-way communication with a terminal apparatus such as the terminal apparatus 20A or 20B. With regard to two-way communication, DSRC communication may be adopted, or cellular communication may be adopted.

Here, the RSU 10B may be a UE-type RSU that performs operation similar to that of the terminal apparatuses 20A and 20B. Alternatively, the RSU 10B may be an eNB-type RSU that performs operation similar to that of the base station 10A. Hereinafter, it is assumed that the RSU 10B is the eNB-type RSU, and the base station 10A and the RSU 10B are also collectively referred to as base stations 10 in a case where it is not necessary to distinguish between the base station 10A and the RSU 10B in particular.

The terminal apparatus 20A is a communication apparatus that is carried by a user 22 and moves as the user 22 walks or runs, or a vehicle (such as a bicycle, bus, motorcycle, or car) travels while the user 22 is on the vehicle. The terminal apparatus 20A is also referred to as a pedestrian UE (PUE) in some cases. The PUE 20A has a function of communicating with the base station 10 under the control of the base station 10. The PUE 20A is also a terminal apparatus that performs communication using any of the communication methods classified as V2X communication. In the following description, it is assumed that the PUE 20A performs V2P communication with, for example, a VUE, and transmits and receives V2P signals. Note that although the single PUE 20A is shown in FIG. 8, it is also possible to provide a plurality of the PUEs 20A. Thus, the PUE 20A may be regarded as a general term for the plurality of PUEs.

The terminal apparatus 20B is a communication apparatus that is mounted on a vehicle 24 and moves as the vehicle 24 travels. The VUE 20B is also referred to as a vehicular UE (VUE) in some cases. The VUE 20B has a function of communicating with the base station 10 under the control of the base station 10. The VUE 20B is also a terminal apparatus that performs communication using any of the communication methods classified as V2X communication. In the following description, it is assumed that the VUE 20B performs V2V communication with another VUE, and transmits and receives V2V signals. Note that although the single VUE 20B is shown in FIG. 8, it is also possible to provide a plurality of the VUEs 20B. Thus, the VUE 20B may be regarded as a general term for the plurality of VUEs.

Hereinafter, the PUE 20A and the VUE 20B are also collectively referred to as terminal apparatuses 20 in a case where it is not necessary to distinguish between the PUE 20A and the VUE 20B in particular.

<2.2. Example of Configuration of Base Station>

Figure 9:
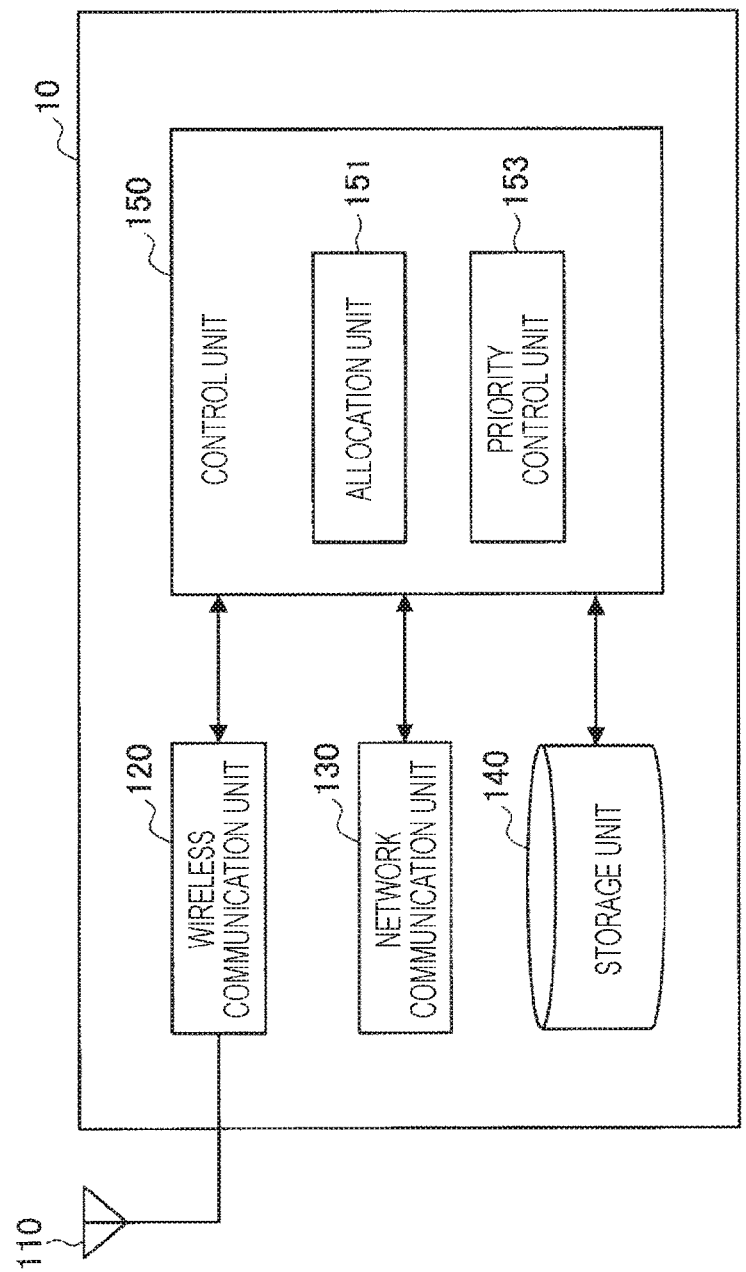
FIG. 9 is a block diagram showing an example of a logical configuration of a base station according to the present embodiment.

FIG. 9 is a block diagram showing an example of a logical configuration of the base station 10 (base station 10A or RSU 10B) according to the present embodiment. As shown in FIG. 9, the base station 10 according to the present embodiment includes an antenna unit 110, a wireless communication unit 120, a network communication unit 130, a storage unit 140, and a control unit 150.

The antenna unit 110 emits a signal output from the wireless communication unit 120 as radio waves in the air. Furthermore, the antenna unit 110 converts radio waves in the air into a signal, and outputs the signal to the wireless communication unit 120.

The wireless communication unit 120 transmits and receives signals. For example, the wireless communication unit 120 receives an uplink signal from a terminal apparatus, and transmits a downlink signal to the terminal apparatus.

The network communication unit 130 transmits and receives information. For example, the network communication unit 130 transmits information to other nodes, and receives information from other nodes. Examples of the other nodes described above include another base station and a core network node.

The storage unit 140 temporarily or permanently stores a program and various data for operation of the base station 10.

The control unit 150 provides various functions of the base station 10. For example, the control unit 150 includes an allocation unit 151 and a priority control unit 153.

The allocation unit 151 performs a process of allocating a resource pool to the terminal apparatus 20. The allocation unit 151 allocates a resource pool (that is, a first resource pool to be described later) that is available to a plurality of the terminal apparatuses 20 using different communication methods classified as V2X communication, on the basis of, for example, information indicating a communication status of SideLink between the terminal apparatuses 20. Then, the allocation unit 151 notifies the terminal apparatus 20 of resource pool allocation information indicating an allocation result.

The priority control unit 153 performs priority control on resource pools. For example, the priority control unit 153 generates setting information regarding priority use of the first resource pool, and notifies the terminal apparatus 20 of the setting information.

<2.3. Example of Configuration of Terminal Apparatus>

Figure 10:
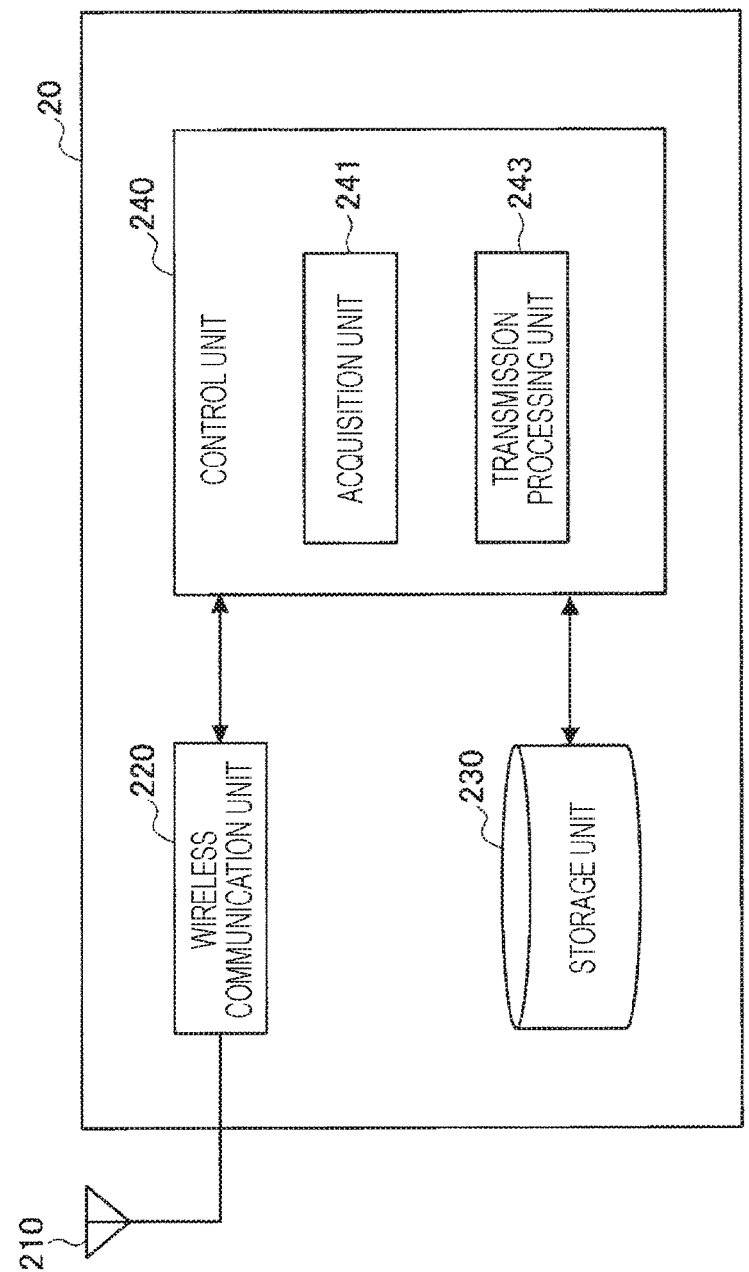
FIG. 10 is a block diagram showing an example of a logical configuration of a terminal apparatus according to the present embodiment.

FIG. 10 is a block diagram showing an example of a logical configuration of the terminal apparatus 20 (20A or 20B) according to the present embodiment. As shown in FIG. 10, the terminal apparatus 20 according to the present embodiment includes an antenna unit 210, a wireless communication unit 220, a storage unit 230, and a control unit 240.

The antenna unit 210 emits a signal output from the wireless communication unit 220 as radio waves in the air. Furthermore, the antenna unit 210 converts radio waves in the air into a signal, and outputs the signal to the wireless communication unit 220.

The wireless communication unit 220 transmits and receives signals. For example, the wireless communication unit 220 receives a downlink signal from a base station, and transmits an uplink signal to the base station. In addition, the wireless communication unit 220 transmits/receives SideLink signals (V2P signal, V2V signal, V2I signal, and the like) to/from another terminal apparatus or an RSU.

The storage unit 230 temporarily or permanently stores a program and various data for operation of the terminal apparatus 20.

The control unit 240 provides various functions of the terminal apparatus 20. For example, the control unit 240 includes an acquisition unit 241 and a transmission processing unit 243. The control unit 240 may also include a constituent element other than these constituent elements.

The acquisition unit 241 performs various processes for acquiring information from the base station 10. For example, the acquisition unit 241 measures a communication status of SideLink, and notifies the base station 10 of information indicating the communication status of SideLink. Then, the acquisition unit 241 acquires information indicating the result of a process performed in the base station 10 on the basis of the communication status of SideLink. Specifically, the acquisition unit 241 acquires resource allocation information and the setting information regarding priority use.

The transmission processing unit 243 performs a transmission process on the basis of the resource allocation information and the setting information regarding priority use, acquired by the acquisition unit 241.

3. Technical Features

<3.1. Flow of Processing>

Figure 11:
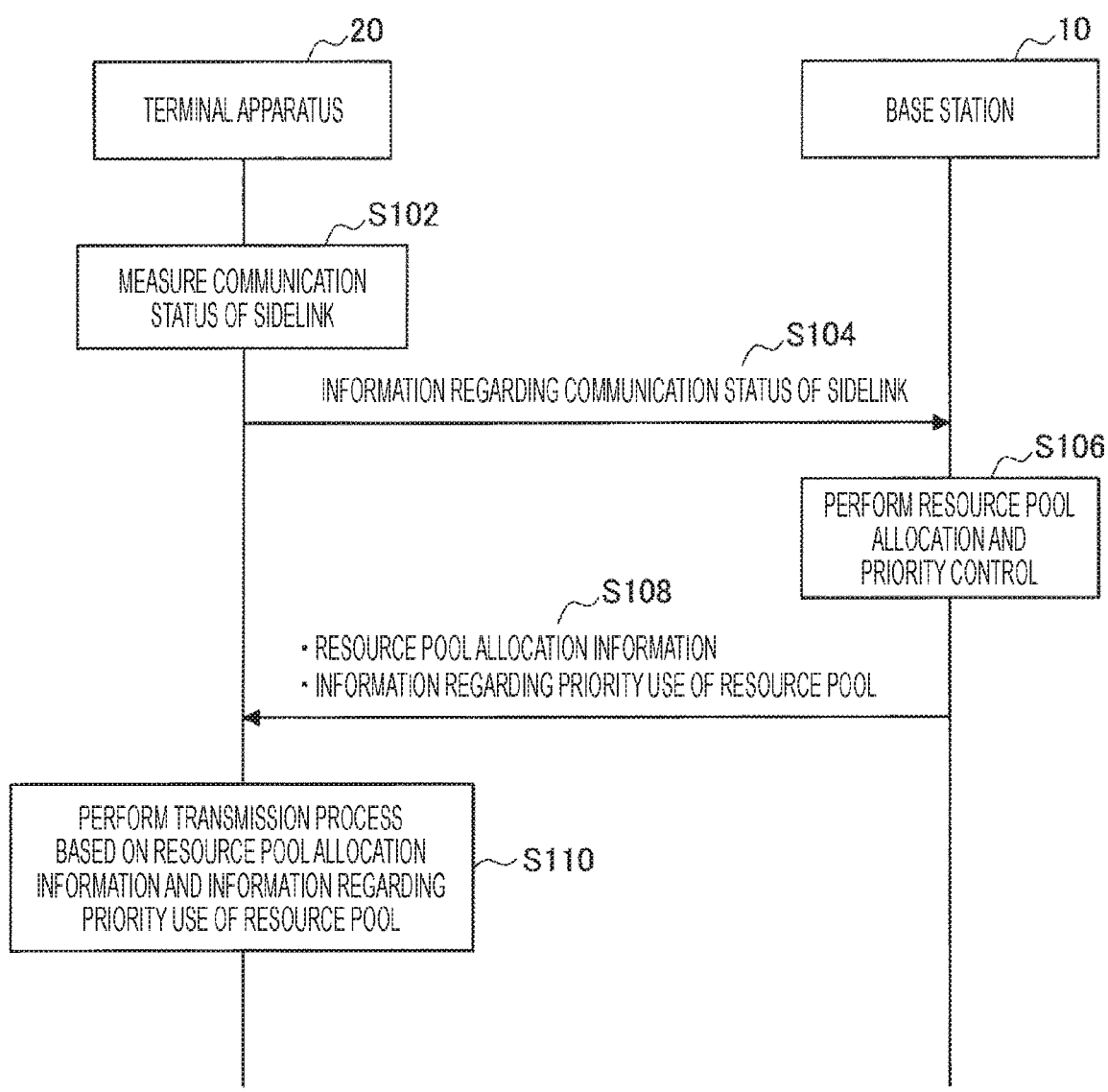
FIG. 11 is a sequence diagram showing an example of the flow of communication processing to be performed in the system according to the present embodiment.

FIG. 11 is a sequence diagram showing an example of the flow of communication processing to be performed in the system 1 according to the present embodiment. As shown in FIG. 11, the base station 10 and the terminal apparatus 20 are involved in this sequence.

First, the terminal apparatus 20 measures a communication status of SideLink (step S102). Next, the terminal apparatus 20 notifies the base station 10 of information regarding the measured communication status of SideLink (step S104). Then, the base station 10 performs resource pool allocation and priority control on the basis of the information regarding the communication status of SideLink (step S106). Subsequently, the base station 10 notifies the terminal apparatus 20 of resource pool allocation information and information regarding priority use of a resource pool (step S108). Then, the terminal apparatus 20 performs a transmission process on the basis of the resource pool allocation information and the information regarding priority use of the resource pool (step S110).

Various information and processes in the above-described sequence will be described below in detail.

<3.2. Information Regarding Communication Status of SideLink>

Information regarding the communication status of SideLink may be measured for each resource pool.

The information regarding the communication status of SideLink may include various information. For example, the information regarding the communication status of SideLink may include one or a plurality of pieces of information to be described below.

For example, the information regarding the communication status of SideLink may include information indicating the congestion degree of SideLink. Such information may be information indicating, for example, a channel busy ratio (CBR) measurement result. Note that the CBR of the PUE 20A and the CBR of the VUE 20B may be measured separately.

For example, the information regarding the communication status of SideLink may include information indicating the number of transmission packets of the PUE 20A. The number of transmission packets of the PUE 20A refers to the result of counting packets transmitted from the PUE 20A. Scheduling assignment (SA) signals may be objects to be counted. Alternatively, data signals may be objects to be counted.

For example, the information regarding the communication status of SideLink may include information indicating the number of transmission packets of the VUE 20B. The number of transmission packets of the VUE 20B refers to the result of counting packets transmitted from the VUE 20B. SA signals may be objects to be counted. Alternatively, data signals may be objects to be counted.

For example, the information regarding the communication status of SideLink may include information indicating the transmission success rate or packet collision rate of the PUE 20A or VUE 20B. The transmission success rate or packet collision rate may be calculated on the basis of an ACK signal and a NACK signal from a receiving apparatus. Furthermore, the transmission success rate or packet collision rate may be calculated on the basis of the number of packets for which DATA signals could not be received by the receiving apparatus out of packets of the PUE 20A or VUE 20B determined on the basis of the SA signals. Moreover, the transmission success rate or packet collision rate may be calculated on the basis of the number of packets of the PUE 20A or VUE 20B found to have collided as a result of sensing.

For example, the information regarding the communication status of SideLink may be a resource allocation change request from the PUE 20A.

For example, the information regarding the communication status of SideLink may be a resource allocation change request from the VUE 20B.

For example, the information regarding the communication status of SideLink may include information indicating the number of terminals of the PUE 20A. The base station 10 grasps this information.

For example, the information regarding the communication status of SideLink may include information indicating the number of terminals of the VUE 20B. The base station 10 grasps this information.

The information regarding the communication status of SideLink has been described above.

The terminal apparatus 20 notifies the base station 10 of the acquired information regarding the communication status of SideLink. For example, the terminal apparatus 20 transmits, to the base station 10, the acquired information regarding the communication status of SideLink by use of an uplink signal or Radio Resource Control (RRC) signaling.

<3.3. Resource Pool Allocation>

Allocation of resource pools is typically performed by the base station 10. A resource pool may be allocated to the terminal apparatus 20 in advance.

Allocation of resource pools may be performed statically or dynamically. From the viewpoint of frequency usage efficiency, it is desirable that allocation of resource pools be performed dynamically. Therefore, a case where resource pool setting is dynamically performed will be described below.

The base station 10 performs allocation of resource pools on the basis of the information regarding the communication status of SideLink, received or acquired by itself.

The base station 10 sets attribute information in association with a resource pool. In other words, the base station 10 sets a resource pool associated with attribute information. The attribute information may be set for each subchannel.

The attribute information may include first attribute information that is information indicating the terminal apparatus 20 that can use the resource pool. For example, the first attribute information differs between the types of resource to be described later. Regarding the first resource pool to be described later, the first attribute information indicates that the first resource pool is available to, for example, the PUE 20A and the VUE 20B. Furthermore, regarding a second resource pool to be described later, the first attribute information indicates that the second resource pool is available only to, for example, the PUE 20A or the VUE 20B. In addition, the first attribute information includes information regarding, for example, a resource selection method (random selection, resource selection using sensing, or both) available in the resource pool. The first attribute information enables the terminal apparatus 20 to determine the availability of the resource pool.

The attribute information may include second attribute information that is a parameter related to a transmission process, to be used in the resource pool. The second attribute information enables the terminal apparatus 20 to perform a transmission process including pre-transmission sensing and packet transmission by using an appropriate parameter.

The attribute information may include both of the first attribute information and the second attribute information, or may include only either one thereof.

Resource Pool Classification

The classification of resource pools will be described below. Resource pools can be roughly classified into the first resource pools and the second resource pools.

(1) Resource Pool Types

A resource pool available to a plurality of terminal apparatuses using the different communication methods classified as V2X communication is also referred to as the first resource pool. For example, the first resource pool can be shared by two or more types of terminal apparatus among the PUE 20A, the VUE 20B, and a terminal apparatus that performs other V2X communication such as V2I communication.

Furthermore, a resource pool available only to a terminal apparatus using a specific one of the communication methods classified as V2X communication is also referred to as the second resource pool. For example, the second resource pool for V2P communication is available only to the PUE 20A, and the second resource pool for V2V communication is available only to the VUE 20B. First, the second resource pool will be described below.

V2V Dedicated Resource Pool

The V2V dedicated resource pool is a resource pool the whole of which is available only to the VUE 20B.

V2P Dedicated Resource Pool

The V2P dedicated resource pool is a resource pool the whole of which is available only to the PUE 20A.

V2X Dedicated Resource Pool

A V2P dedicated resource pool is a resource pool the whole of which is available only to XUEs. Note that the XUE refers to a terminal apparatus which is neither the PUE 20A nor the VUE 20B.

The second resource pool has been described above. The first resource pool will be described below.

Shared Resource Pool

The shared resource pool is a resource pool the whole of which is available to both of the PUE 20A and the UE 20B. Note that UEs that can use the shared resource pool are not limited to the PUE 20A or the UE 20B, and other terminal apparatuses such as terminal apparatuses that perform V2I communication can also be included in such UEs. Furthermore, the UEs that can use the shared resource pool may be limited to two or more specific terminal apparatuses.

Overlap Resource Pool

The overlap resource pool refers to an area in the second resource pool, overlapping with another second resource pool. For example, the overlap resource pool is a resource pool corresponding to an overlap between the V2V dedicated resource pool and the V2P dedicated resource pool, and is available to both of the PUE 20A and the UE 20B. Note that UEs that can use the shared resource pool are not limited to the PUE 20A or the UE 20B, and other terminal apparatuses such as terminal apparatuses that perform V2I communication can also be included in such UEs. Furthermore, the UEs that can use the shared resource pool may be limited to two or more specific terminal apparatuses. Moreover, the attribute information may include information indicating terminals (for example, VUE, PUE, and the like) to which overlapping dedicated resource pools are available.

The probability of availability of the overlap resource pool may be set as the second attribute information. The PUE 20A and the VUE 20B can use the overlap resource pool according to the set probability. Note that it is possible to set a different value as the probability of availability of the overlap resource pool for each of the PUE 20A and the VUE 20B, and notify the PUE 20A and the VUE 20B of the respective set values.

The second attribute information may include threshold information to be used by the terminal apparatus 20 to determine whether or not to use the overlap resource pool. In other words, the base station 10 may notify the terminal apparatus 20 of the threshold information to be used by the terminal apparatus 20 to determine whether or not to use the overlap resource pool. The threshold information is regarding, for example, the number of the terminal apparatuses 20 for each communication method (that is, the number of terminals of the PUE 20A or the number of terminals of the VUE 20B), the number of transmission packets, the number of packet collisions, the number of detected candidate resources (number of candidate resources judged to be transmittable as a result of performing pre-transmission sensing), a resource congestion level (for example, CBR) (note that the congestion level may be provided individually for each of the PUE and the VUE, or may be provided collectively for both of the PUE and the VUE), detection of the terminal apparatuses 20 for each communication method (that is, detection of the VUE 20A or the UE 20B), or the like. The terminal apparatus 20 monitors these values while using each dedicated resource pool, and uses the overlap resource pool (that is, migrates) in a case where the values exceed or fall below notified thresholds. Note that the number of candidate resources judged to be transmittable is calculated in the process of determining transmittable candidate resources in a pre-transmission sensing process (also referred to as carrier sensing). For example, in a case where the number of candidate resources is equal to or less than the threshold (that is, in a case where transmittable candidate resources are insufficient), the terminal apparatus 20 can use the overlap resource pool to increase the transmittable candidate resource pool. Furthermore, it is also possible to adopt a configuration in which the terminal apparatus 20 does not voluntarily use the overlap resource pool unless, for example, the number of the VUEs 20B or the number of transmission packets reaches or exceeds the threshold.

Prioritized Resource Pool

A prioritized resource pool is an example of the shared resource pool, and is a resource pool that can be preferentially used by the PUE 20A or the VUE 20B. The base station 10 can set a prioritized resource pool that can be preferentially used by the PUE 20A and a prioritized resource pool that can be preferentially used by the VUE 20B.

With regard to the prioritized resource pool, the second attribute information includes information indicating, for example, the terminal apparatus 20 that can preferentially use the prioritized resource pool, a parameter to be changed, and the amount of change of the parameter to be changed. Note that the second attribute information regarding the prioritized resource pool may include the same type of information as the setting information regarding priority use to be described later, and can be regarded as the setting information regarding priority use accordingly.

The second attribute information regarding the prioritized resource pool may include a parameter on a resource reselection implementation probability. The resource reselection implementation probability refers to the probability of reselecting another resource when a packet collision occurs. As the resource reselection implementation probability decreases, a higher priority is given. In addition to the implementation probability of resource selection, a counter value before implementation of resource selection may be used.

The second attribute information regarding the prioritized resource pool may include a threshold parameter related to selection of candidate resources capable of performing communication in pre-transmission sensing. As a threshold decreases, a candidate resource is more likely to be judged capable of performing communication. Thus, a higher priority is given.

The second attribute information regarding the prioritized resource pool may include a parameter on the number of resources that can be reserved. As the number of resources that can be reserved increases, communication becomes easier. Thus, a higher priority is given.

The second attribute information regarding the prioritized resource pool may include a parameter on a priority level. As the priority level increases, a priority to be assigned to a packet can be further raised. Thus, a higher priority is given.

The second attribute information regarding the prioritized resource pool may include a parameter on transmission power. As the transmission power is adjusted to increase, the probability of successful transmission increases. Thus, a higher priority is given.

Sensing Resource Pool

A sensing resource pool is a resource pool that requires pre-transmission sensing to be performed when communication is performed. In other words, the sensing resource pool is a pool that requires terminals that perform communication within the resource pool to use resource selection using sensing. The sensing here may be full sensing to be performed by the VUE or partial sensing to be performed by the PUE. A parameter for pre-transmission sensing may be set for each terminal apparatus 20. Furthermore, the parameter for pre-transmission sensing may be notified as an offset value relative to a reference resource pool.

Random Selection Resource Pool

A random selection resource pool is a resource pool that does not require pre-transmission sensing to be performed, and allows resources to be randomly selected to implement communication. In other words, the random selection resource pool is a pool that requires terminals that perform communication within the resource pool to use only random selection without performing sensing.

Random Selection and Sensing Resource Pool

A random selection and sensing resource pool is a resource pool for which either random selection or resource selection using sensing can be used.

(2) Specific Example of Resource Pool Allocation

Described below is a specific example of resource pool allocation by the base station 10, based on the information regarding the communication status of SideLink.

In a case where the congestion degree of SideLink is equal to or less than a threshold, the base station 10 determines that it is not necessary to improve resource utilization efficiency, and performs operation in the dedicated case. In that case, the base station 10 sets the V2P dedicated resource pool and the V2V dedicated resource pool according to the number of terminals of each of the PUE 20A and the VUE 20B.

The base station 10 performs operation in the dedicated case in a case where the number of transmission packets of the PUE 20A or the number of terminals of the PUE 20A reaches or exceeds a threshold. The reason is that if operation in the shared case is performed in a situation where there is congestion in packet transmission by the PUE 20A, there is a possibility that the communication quality of V2P communication may be deteriorated due to interference from V2V communication. It is possible to secure the communication quality of V2P communication by performing operation in the dedicated case in the situation where there is congestion in packet transmission by the PUE 20A.

In a case where the number of terminals of the PUE 20A is small and the number of terminals of the VUE 20B is large, the base station 10 performs operation in the shared case and sets the shared resource pool. This is because if the V2P dedicated resource pool is set, the frequency usage efficiency decreases.

In a case where the transmission packet success rate of V2V communication decreases in the random selection resource pool, a possible reason for this is that the PUE 20A is performing communication by randomly selecting a resource without performing pre-transmission sensing. Therefore, in such a situation, the base station 10 can prevent a decrease of the transmission packet success rate of V2V communication by setting the sensing resource pool and causing the PUE 20A to perform pre-transmission sensing.

(3) Notification of Resource Pool Allocation Information

The base station 10 notifies the terminal apparatus 20 of resource pool allocation information indicating a result of allocation of resource pools. For example, the base station 10 notifies the terminal apparatus 20 of the resource pool allocation information at a timing when resource pool allocation has been performed, that is, a change has been made.

The resource pool allocation information includes information indicating the position and size of a resource pool in a time direction and information indicating the position and size thereof in a frequency direction. The resource pool allocation information may include information indicating the timing of applying the resource pool allocation information, that is, the timing of reflecting a change in the position, size, or attribute information of the resource pool.

Furthermore, the resource pool allocation information includes the attribute information of the resource pool.

Note that in a case where the terminal apparatus 20 is newly added and attempts to perform SideLink communication, it is possible to define a period in which a resource pool is not allocated to the terminal apparatus 20. For example, the period in which resource pool allocation is not performed may be defined as a period of t (milliseconds) from the timing x of changing resource pool allocation. The base station 10 does not notify resource pool allocation information during a period from time x−t to time x. The base station 10 allocates a resource pool to the newly-added terminal apparatus 20 after time x.

The resource pool allocation information can be notified by use of, for example, RRC signaling or system information (for example, a system information block (SIB)). Alternatively, the resource pool allocation information may be set in advance in the terminal apparatus 20.

<3.4. Priority Control>

The base station 10 performs priority control in the first resource pool. For example, the base station 10 performs control so that the PUE 20A can secure resources in preference to the VUE 20B in the shared resource pool.

(1) Setting Information regarding Priority Use

To that end, the base station 10 sets the setting information regarding priority use in the first resource pool.

For example, the base station 10 sets the setting information regarding priority use in the shared resource pool. For example, the base station 10 sets the setting information regarding priority use in the overlap resource pool. For example, the base station 10 sets a prioritization zone in the shared resource pool. Specifically, the base station 10 sets, in the shared resource pool, a specific area (sub-resource pool) that can be preferentially used by the terminal apparatus 20 using a specific communication method.

Besides, the base station 10 may set the prioritized resource pool, as an example of priority control. In that case, the terminal apparatus 20 is notified of information regarding priority use as, for example, attribute information associated with the prioritized resource pool (more specifically, the second attribute information regarding the prioritized resource pool described above).

The setting information regarding priority use includes a parameter to be set with regard to a transmission process and information indicating setting details of the parameter. The terminal apparatus 20 can perform the transmission process by using a parameter set for the terminal apparatus 20, on the basis of the setting information regarding priority use.

The setting information regarding priority use may include information indicating a communication method of a terminal apparatus that can preferentially use the first resource pool. Thus, the terminal apparatus 20 can determine whether or not the terminal apparatus 20 can preferentially use the first resource pool, on the basis of its own communication method.

Typically, the setting information regarding priority use is generated by the base station 10, and notified to the terminal apparatus 20 by the base station 10. In that case, the setting information regarding priority use can be notified by use of, for example, RRC signaling or system information. Besides, the setting information regarding priority use may be generated by the terminal apparatus 20 and notified to another terminal apparatus 20. Furthermore, the setting information regarding priority use may be set in advance in the terminal apparatus 20.

(2) Specific Example of Priority Control

A case where preference is given to the PUE 20A over the VUE 20B will be specifically described below.

Priority Control on Number of Terminals or Number of Transmission Packets

Parameters to be set in the setting information regarding priority use may include a parameter on the number of terminals or the number of transmission packets.

For example, in a case where the number of the VUEs 20B or the number of transmission packets is equal to or less than a predetermined threshold, the VUE 20B avoids using the overlap resource pool or the prioritized resource pool that can be preferentially used by the PUE 20A, or uses the overlap resource pool or the prioritized resource pool that can be preferentially used by the PUE 20A, with a set probability of X1%. Note that it is assumed that a parameter of "X" with a number added thereto is a parameter set in the setting information regarding priority use.

Priority Control on Range of Candidate Resources

The parameters to be set in the setting information regarding priority use may include information for determining a candidate resource allowed to be actually used or not allowed to be used, among candidate resources judged to be available in a sensing process before packet transmission.

The terminal apparatus 20 typically performs sensing before packet transmission to select candidate resources that are candidates for a resource to be used for packet transmission. At this time, the terminal apparatus 20 ranks resources in order of desirableness, and selects a resource to be used for packet transmission from among the ranked resources. Then, the information for determining a candidate resource allowed to be actually used or not allowed to be used may be information indicating the rankings of candidate resources allowed to be used or not allowed to be used among a plurality of the ranked candidate resources.

For example, the VUE 20B may exclude some of the ranked candidate resources from the candidate resources on the basis of the setting information regarding priority use. This enables the PUE 20A to use the excluded resources. The resources to be excluded may be set as resources ranked in the top X2%, or may be set as resources in a specific ranking range (X3rd to X4th).

For example, the PUE 20A may preferentially use some resources among the ranked candidate resources on the basis of the setting information regarding priority use. Resources to be preferentially used may be set as resources ranked in the top X5%, or may be set as resources in a specific ranking range (X6th to X7th).

Priority Control on Resource Reselection Implementation Probability

The parameters to be set in the setting information regarding priority use may include a parameter on the resource reselection implementation probability. Furthermore, the parameters to be set in the setting information regarding priority use may include a counter value to be used for resource reselection.

For example, the VUE 20B increases the resource reselection probability to perform more, on the basis of the setting information regarding priority use.

For example, the PUE 20A reduces the resource reselection probability to perform less, on the basis of the setting information regarding priority use.

Number of Selectable Candidate Resources

The parameters to be set in the setting information regarding priority use may include a parameter on the number of selectable candidate resources.

For example, the VUE 20B resets a threshold for selection of candidate resources capable of performing communication in the pre-transmission sensing on the basis of the setting information regarding priority use. For example, the VUE 20B sets a threshold such that the number of candidate resources becomes a predetermined value (for example, X8).

For example, the PUE 20A resets a threshold for selection of candidate resources capable of performing communication in the pre-transmission sensing on the basis of the setting information regarding priority use. For example, the PUE 20A sets a threshold such that the number of candidate resources becomes a predetermined value (for example, X9).

Number of Resources that can be Reserved

The parameters to be set in the setting information regarding priority use may include a parameter on the number of resources that can be reserved.

For example, the VUE 20B may reset the number of resources that can be reserved, on the basis of the setting information regarding priority use. For example, the VUE 20B reduces the number of resources that can be reserved by X10.

For example, the PUE 20A may reset the number of resources that can be reserved, on the basis of the setting information regarding priority use. In particular, when performing partial sensing, the PUE 20A may reset the number of resources that can be reserved, on the basis of the setting information regarding priority use. For example, the PUE 20A increases the number of resources that can be reserved by X11. Note that the value of the parameter X11 may differ depending on whether or not partial sensing is performed.

Priority Level

The parameters to be set in the setting information regarding priority use may include a parameter on a priority level to be assigned to a transmission packet.

For example, the VUE 20B may reset the priority level on the basis of the setting information regarding priority use. For example, the VUE 20B reduces the priority level by an offset X12.

For example, the PUE 20A may reset the priority level on the basis of the setting information regarding priority use. For example, the PUE 20A increases the priority level by an offset X13.

Transmission Power

The parameters to be set in the setting information regarding priority use may include a parameter on transmission power.

For example, the PUE 20A may reset transmission power on the basis of the setting information regarding priority use. For example, the PUE 20A increases the transmission power by X14% or by an offset G.

Number of Transmission Reservations

The parameters to be set in the setting information regarding priority use may include a parameter on the number of transmission reservations.

For example, the VUE 20B may reset the number of reservations for packet transmission of the PUE 20A on the basis of the setting information regarding priority use. For example, the VUE 20B sets the number of reservations for packet transmission of the PUE 20A to infinity. The VUE 20B may rewrite the number of packet transmission reservations such that the number of packet transmission reservations is infinite, in a case where the PUE 20A notifies the VUE 20B of the number of packet transmission reservations.

Communication Prohibited Area

The parameters to be set in the setting information regarding priority use may include a parameter related to a communication prohibited area.

For example, the PUE 20A may notify the VUE 20B of the communication prohibited area. The communication prohibited area may be notified to the VUE 20B directly by the PUE 20A, or may be notified to the VUE 20B by the base station 10. The communication prohibited area may be designated in a sub resource pool set in advance. The communication prohibited area is defined as a resource in the frequency direction and the time axis direction.

Prohibited Range of Resource Usage

The parameters to be set in the setting information regarding priority use may include a parameter related to a prohibited range of resource usage. Furthermore, the parameters to be set in the setting information regarding priority use may include information regarding activation/release of the prohibited range. As a result, it becomes possible to set the validity/invalidity of the prohibited range by using the activation/release information.

For example, the VUE 20B may avoid using resources around a resource to be used by the PUE 20A, on the basis of the setting information regarding priority use. For example, the terminal apparatus 20 avoids using resources around a resource to be used by the PUE 20A, within a range specified in the setting information regarding priority use.

Notification of Information Regarding Transmission Packet

The terminal apparatus 20 may add, to a packet to be transmitted, information indicating the communication method of the terminal apparatus 20 itself. In particular, the PUE 20A adds information indicating V2P communication to a transmission packet. As a result, the PUE 20A can cause a receiver to recognize that the transmission source of the packet is the PUE 20A, and can cause the receiver to take measures to avoid interfering with the packet. For example, in a case where the VUE 20B finds a V2P signal in a certain resource, the VUE 20B may exclude the resource from candidate resources to avoid causing a packet collision.

When transmitting a signal, the PUE 20A may notify the base station 10 of information indicating transmission of the signal. As a result, the PUE 20A can notify the base station 10 that the V2P signal is to be transmitted, and can cause the base station 10 to take measures to avoid interfering with the V2P signal. For example, the base station 10 sets the V2P dedicated resource pool to be used by the PUE 20A as the notification source.

<3.5. Transmission Process>

The terminal apparatus 20 acquires resource pool allocation information and setting information regarding priority use. Then, the terminal apparatus 20 performs a packet transmission process using a resource pool on the basis of its own communication method, the resource pool allocation information, and the setting information regarding priority use. First, the terminal apparatus 20 selects a resource pool that allows communication using its own communication method from among resource pools specified in the resource pool allocation information. Then, the terminal apparatus 20 performs a transmission process in the selected resource pool by using a parameter corresponding to its own communication method. For example, the PUE 20A selects the V2P dedicated resource pool or the shared resource pool, and performs a transmission process by using a parameter corresponding to V2P communication.

The transmission process is a concept that includes various processes such as sensing to be performed for selecting candidate resources before packet transmission, packet transmission using a resource selected from among the selected candidate resources, and reservation of a resource for packet transmission.

4. Applications

The technology according to the present disclosure can be applied to various products. For example, the base station 10 (particularly, the base station 10A) may be implemented as any type of evolved Node B (eNB) such as a macro eNB or a small eNB. The small eNB may be an eNB that covers a cell smaller than a macrocell, such as a pico eNB, a micro eNB, or a home (femto) eNB. Instead, the base station 10 may be implemented as another type of base station such as a Node B or a base transceiver station (BTS). The base station 10 may include a main body (also referred to as a base station apparatus) that controls wireless communication, and one or more remote radio heads (RRHs) located separately from the main body. Furthermore, various types of terminal to be described later may operate as the base station 10 by temporarily or semi-permanently performing base station functions.

Moreover, the terminal apparatus 20 may be implemented as, for example, a mobile terminal or a vehicular UE. Examples of the mobile terminal include a smartphone, a tablet personal computer (PC), a notebook PC, a portable game terminal, a portable/dongle type mobile router, and a digital camera. Examples of the vehicular UE include a car navigation apparatus. In addition, the terminal apparatus 20 may be implemented as a terminal (also referred to as a machine type communication (MTC) terminal) that performs machine to machine (M2M) communication. Furthermore, the terminal apparatus 20 may be a wireless communication module (for example, an integrated circuit module including a single die) mounted on these terminals.

<4.1. Applications of Base Station>

(First Application)

Figure 12:
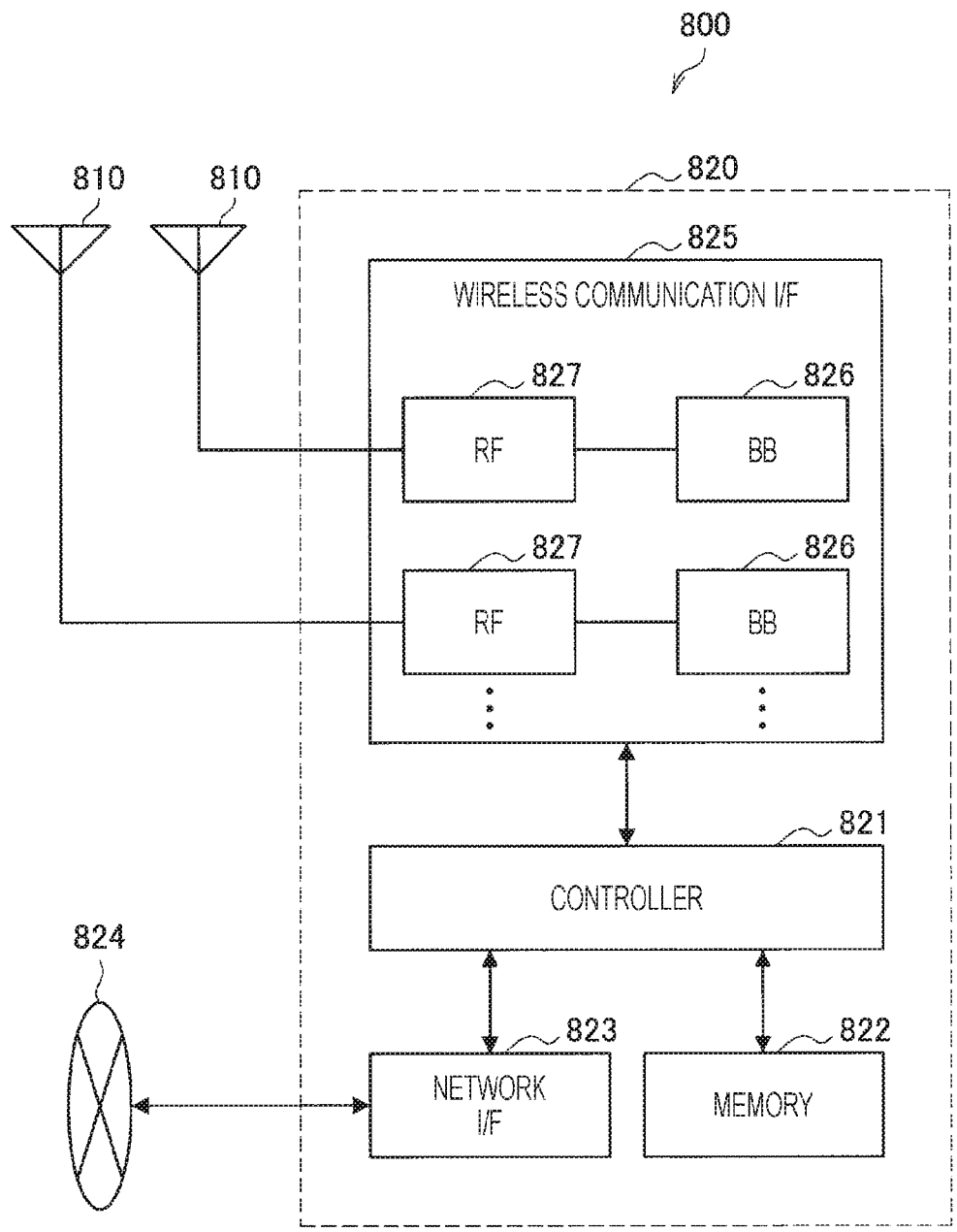
FIG. 12 is a block diagram showing a first example of a schematic configuration of an eNB.

FIG. 12 is a block diagram showing a first example of a schematic configuration of an eNB to which the technology according to the present disclosure can be applied. An eNB 800 includes one or more antennas 810 and a base station apparatus 820. Each antenna 810 and the base station apparatus 820 can be connected to each other via an RF cable.

Each of the antennas 810 includes a single or a plurality of antenna elements (for example, a plurality of antenna elements forming a MIMO antenna), and is used by the base station apparatus 820 for transmitting and receiving wireless signals. The eNB 800 may include a plurality of the antennas 810 as shown in FIG. 12. The plurality of antennas 810 may correspond to, for example, a plurality of frequency bands to be used by the eNB 800. Note that although FIG. 12 shows an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or DSP. The controller 821 causes various upper-layer functions of the base station apparatus 820 to be performed. For example, the controller 821 generates a data packet from data in a signal processed by the wireless communication interface 825, and transfers the generated packet via the network interface 823. The controller 821 may generate a bundled packet by bundling data from a plurality of baseband processors, and transfer the bundled packet that has been generated. Furthermore, the controller 821 may have a logical function of performing control such as radio resource control, radio bearer control, mobility management, admission control, or scheduling. Furthermore, the control may be performed in cooperation with neighboring eNBs or core network nodes. The memory 822 includes a RAM and a ROM, and stores a program to be executed by the controller 821 and various control data (for example, a terminal list, transmission power data, scheduling data, and the like).

The network interface 823 is a communication interface for connecting the base station apparatus 820 to a core network 824. The controller 821 may communicate with a core network node or another eNB via the network interface 823. In that case, the eNB 800 and the core network node or another eNB may be connected to each other via a logical interface (for example, an S1 interface or X2 interface). The network interface 823 may be a wired communication interface or a wireless communication interface for a wireless backhaul. In a case where the network interface 823 is a wireless communication interface, the network interface 823 may use, for wireless communication, a frequency band higher than a frequency band to be used by the wireless communication interface 825.

The wireless communication interface 825 supports any cellular communication system such as Long Term Evolution (LTE) or LTE-Advanced, and provides a wireless connection to a terminal located in a cell of the eNB 800 via the antenna 810. The wireless communication interface 825 may typically include a baseband (BB) processor 826, an RF circuit 827, and the like. The BB processor 826 may perform, for example, coding/decoding, modulation/demodulation, multiplexing/demultiplexing, and the like. The BB processor 826 processes various signals in each layer (for example, L1, medium access control (MAC), radio link control (RLC), and Packet Data Convergence Protocol (PDCP)). In place of the controller 821, the BB processor 826 may have some or all of the logical functions described above. The BB processor 826 may be a module including a memory that stores a communication control program, a processor that executes the program, and a related circuit. The BB processor 826 may be configured such that it is possible to change the function of the BB processor 826 by updating the above-described program. Furthermore, the above-described module may be a card or blade to be inserted into a slot of the base station apparatus 820, or may be a chip to be mounted on the above-described card or blade. Meanwhile, the RF circuit 827 may include a mixer, a filter, an amplifier, and the like. The RF circuit 827 transmits and receives wireless signals via the antenna 810.

The wireless communication interface 825 may include a plurality of the BB processors 826 as shown in FIG. 12. The plurality of BB processors 826 may correspond to, for example, the plurality of frequency bands to be used by the eNB 800. Furthermore, the wireless communication interface 825 may include a plurality of the RF circuits 827 as shown in FIG. 12. The plurality of RF circuits 827 may correspond to, for example, a plurality of antenna elements. Note that although FIG. 12 shows an example in which the wireless communication interface 825 includes the plurality of BB processors 826 and the plurality of RF circuits 827, the wireless communication interface 825 may include the single BB processor 826 or the single RF circuit 827.

One or more constituent elements (allocation unit 151 and/or priority control unit 153) included in the control unit 150 described with reference to FIG. 9 may be implemented in the wireless communication interface 825 in the eNB 800 shown in FIG. 12. Alternatively, at least one of these constituent elements may be implemented in the controller 821. As one example, the eNB 800 may be equipped with a module including a part (for example, the BB processor 826) or all of the wireless communication interface 825 and/or the controller 821, so that the one or more constituent elements described above may be implemented in the module. In this case, the above-described module may store a program for causing a processor to function as the one or more constituent elements (in other words, a program for causing the processor to perform the operation of the one or more constituent elements), and may execute the program. As another example, a program for causing a processor to function as the one or more constituent elements may be installed in the eNB 800, and executed by the wireless communication interface 825 (for example, the BB processor 826) and/or the controller 821. As described above, the eNB 800, the base station apparatus 820, or the above-described module may be provided as an apparatus including the one or more constituent elements. In addition, a program for causing a processor to function as the one or more constituent elements may also be provided. Moreover, a readable recording medium on which the above-described program has been recorded may be provided.

Furthermore, the wireless communication unit 120 described with reference to FIG. 9 may be implemented in the wireless communication interface 825 (for example, the RF circuit 827) in the eNB 800 shown in FIG. 12. In addition, the antenna unit 110 may be implemented on the antenna 810. Moreover, the network communication unit 130 may be implemented in the controller 821 and/or the network interface 823. Furthermore, the storage unit 140 may be implemented in the memory 822.

(Second Application)

Figure 13:
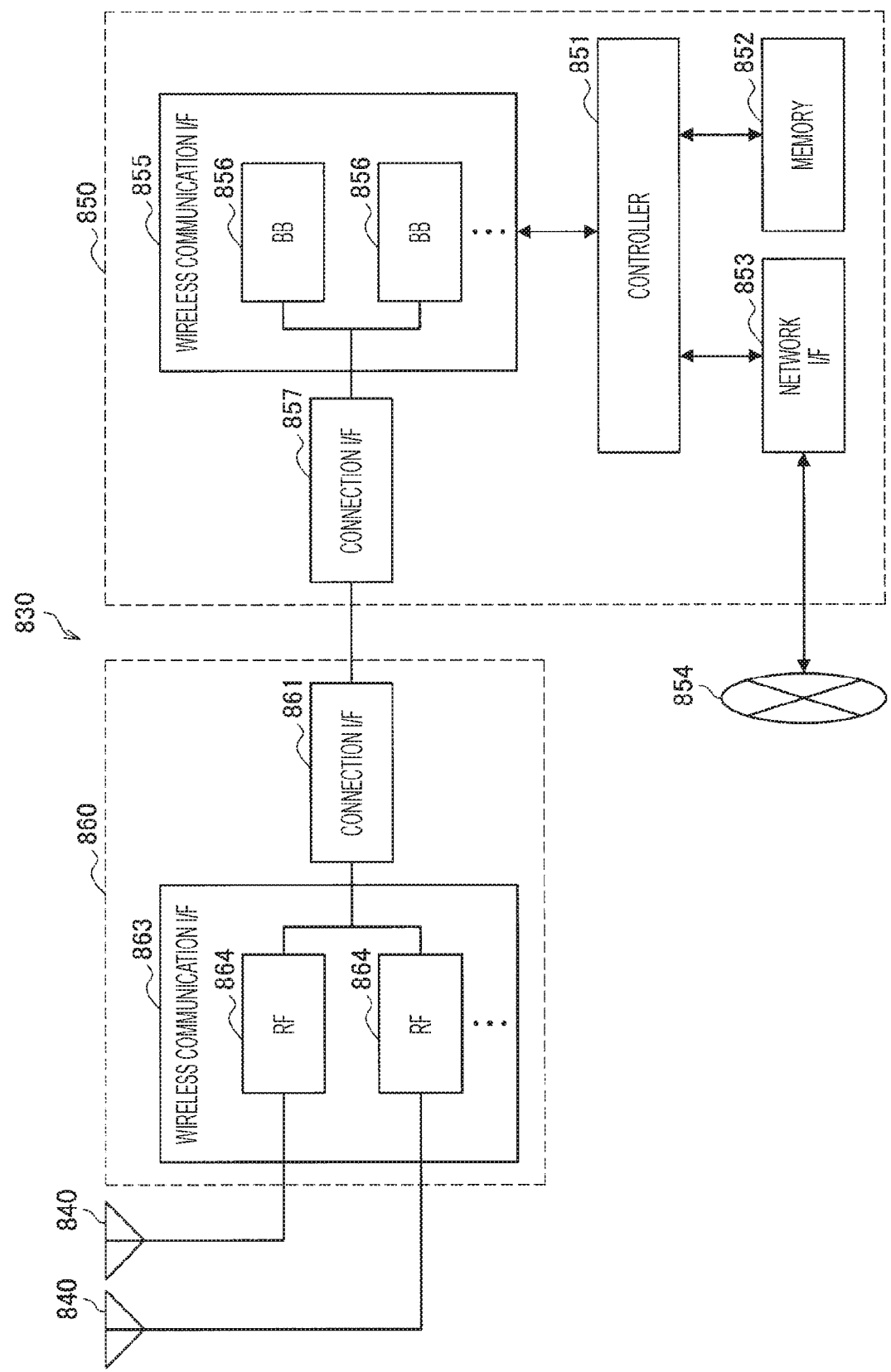
FIG. 13 is a block diagram showing a second example of the schematic configuration of the eNB.

FIG. 13 is a block diagram showing a second example of the schematic configuration of the eNB to which the technology according to the present disclosure can be applied. An eNB 830 includes one or more antennas 840, a base station apparatus 850, and an RRH 860. Each antenna 840 and the RRH 860 can be connected to each other via an RF cable. Furthermore, the base station apparatus 850 and the RRH 860 can be connected to each other via a high-speed line such as an optical fiber cable.

Each of the antennas 840 includes a single or a plurality of antenna elements (for example, a plurality of antenna elements forming a MIMO antenna), and is used by the RRH 860 for transmitting and receiving wireless signals. The eNB 830 may include a plurality of the antennas 840 as shown in FIG. 13. The plurality of antennas 840 may correspond to, for example, a plurality of frequency bands to be used by the eNB 830. Note that although FIG. 13 shows an example in which the eNB 830 includes the plurality of antennas 840, the eNB 830 may include the single antenna 840.

The base station apparatus 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 12.

The wireless communication interface 855 supports any cellular communication system such as LTE or LTE-Advanced, and provides a wireless connection to a terminal located in a sector corresponding to the RRH 860 via the RRH 860 and the antenna 840. The wireless communication interface 855 may typically include a BB processor 856 and the like. The BB processor 856 is similar to the BB processor 826 described with reference to FIG. 12 except that the BB processor 856 is connected to an RF circuit 864 of the RRH 860 via the connection interface 857. The wireless communication interface 855 may include a plurality of the BB processors 856 as shown in FIG. 13. The plurality of BB processors 856 may correspond to, for example, the plurality of frequency bands to be used by the eNB 830. Note that although FIG. 13 shows an example in which the wireless communication interface 855 includes the plurality of BB processors 856, the wireless communication interface 855 may include the single BB processor 856.

The connection interface 857 is an interface for connecting the base station apparatus 850 (wireless communication interface 855) to the RRH 860. The connection interface 857 may be a communication module for communication on the above-described high-speed line that connects the base station apparatus 850 (wireless communication interface 855) and the RRH 860.

Furthermore, the RRH 860 includes a connection interface 861 and a wireless communication interface 863.

The connection interface 861 is an interface for connecting the RRH 860 (wireless communication interface 863) to the base station apparatus 850. The connection interface 861 may be a communication module for communication on the above-described high-speed line.

The wireless communication interface 863 transmits and receives wireless signals via the antenna 840. The wireless communication interface 863 may typically include the RF circuit 864 and the like. The RF circuit 864 may include a mixer, a filter, an amplifier, and the like. The RF circuit 864 transmits and receives wireless signals via the antenna 840. The wireless communication interface 863 may include a plurality of the RF circuits 864 as shown in FIG. 13. The plurality of RF circuits 864 may correspond to, for example, a plurality of antenna elements. Note that although FIG. 13 shows an example in which the wireless communication interface 863 includes the plurality of RF circuits 864, the wireless communication interface 863 may include the single RF circuit 864.

One or more constituent elements (allocation unit 151 and/or priority control unit 153) included in the control unit 150 described with reference to FIG. 9 may be implemented in the wireless communication interface 855 and/or the wireless communication interface 863 in the eNB 830 shown in FIG. 13. Alternatively, at least one of these constituent elements may be implemented in the controller 851. As one example, the eNB 830 may be equipped with a module including a part (for example, the BB processor 856) or all of the wireless communication interface 855 and/or the controller 851, so that the one or more constituent elements described above may be implemented in the module. In this case, the above-described module may store a program for causing a processor to function as the one or more constituent elements (in other words, a program for causing the processor to perform the operation of the one or more constituent elements), and may execute the program. As another example, a program for causing a processor to function as the one or more constituent elements may be installed in the eNB 830, and executed by the wireless communication interface 855 (for example, the BB processor 856) and/or the controller 851. As described above, the eNB 830, the base station apparatus 850, or the above-described module may be provided as an apparatus including the one or more constituent elements. In addition, a program for causing a processor to function as the one or more constituent elements may also be provided. Moreover, a readable recording medium on which the above-described program has been recorded may be provided.

Furthermore, for example, the wireless communication unit 120 described with reference to FIG. 9 may be implemented in the wireless communication interface 863 (for example, the RF circuit 864) in the eNB 830 shown in FIG. 13. In addition, the antenna unit 110 may be implemented on the antenna 840. Moreover, the network communication unit 130 may be implemented in the controller 851 and/or the network interface 853. Furthermore, the storage unit 140 may be implemented in the memory 852.

<4.2. Applications of Terminal Apparatus>

(First Application)

Figure 14:
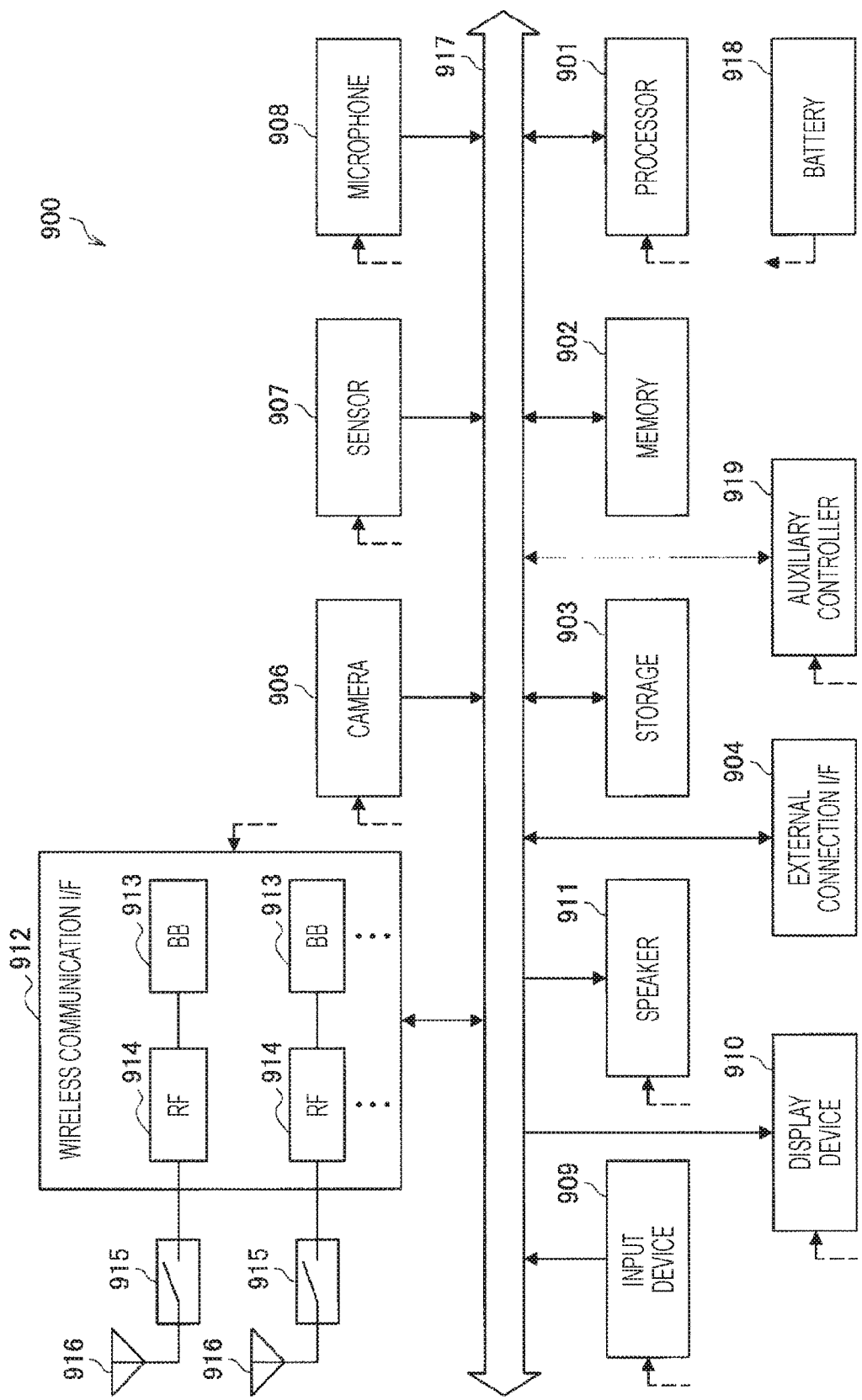
FIG. 14 is a block diagram showing an example of a schematic configuration of a smartphone.

FIG. 14 is a block diagram showing an example of a schematic configuration of a smartphone 900 to which the technology according to the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC). The processor 901 controls functions of an application layer and other layers of the smartphone 900. The memory 902 includes a RAM and a ROM, and stores data and a program to be executed by the processor 901. The storage 903 may include a storage medium such as a semiconductor memory or a hard disk. The external connection interface 904 is an interface for connecting an external device, such as a memory card or a universal serial bus (USB) device, to the smartphone 900.

The camera 906 includes, for example, an imaging element such as a charge coupled device (CCD) or a complementary metal oxide semiconductor (CMOS), and generates a captured image. The sensor 907 may include, for example, a group of sensors such as a positioning sensor, a gyro sensor, a geomagnetic sensor, and an acceleration sensor. The microphone 908 converts voice input to the smartphone 900 into a voice signal. The input device 909 includes, for example, a touch sensor for detecting a touch on a screen of the display device 910, a keypad, a keyboard, a button or switch, and the like. The input device 909 accepts an operation or information input from a user. The display device 910 includes a screen such as a liquid crystal display (LCD) or an organic light emitting diode (OLED) display, and displays an image output from the smartphone 900. The speaker 911 converts a voice signal output from the smartphone 900 into voice.

The wireless communication interface 912 supports any cellular communication system such as LTE or LTE-Advanced to perform wireless communication. The wireless communication interface 912 may typically include a BB processor 913, an RF circuit 914, and the like. The BB processor 913 may perform, for example, coding/decoding, modulation/demodulation, multiplexing/demultiplexing, and the like. The BB processor 913 performs various signal processing for wireless communication. Meanwhile, the RF circuit 914 may include a mixer, a filter, an amplifier, and the like. The RF circuit 914 transmits and receives wireless signals via the antenna 916. The wireless communication interface 912 may be a one-chip module in which the BB processor 913 and the RF circuit 914 are integrated. The wireless communication interface 912 may include a plurality of the BB processors 913 and a plurality of the RF circuits 914 as shown in FIG. 14. Note that although FIG. 14 shows an example in which the wireless communication interface 912 includes the plurality of BB processors 913 and the plurality of RF circuits 914, the wireless communication interface 912 may include the single BB processor 913 or the single RF circuit 914.

Moreover, in addition to the cellular communication system, the wireless communication interface 912 may support another type of wireless communication system such as a near field communication system, a proximity wireless communication system, or a wireless local area network (LAN) system. In that case, the wireless communication interface 912 may include the BB processor 913 and the RF circuit 914 for each wireless communication system.

Each of the antenna switches 915 causes a connection destination of the antenna 916 to switch between a plurality of circuits (for example, circuits for different wireless communication systems) included in the wireless communication interface 912.

Each of the antennas 916 includes a single or a plurality of antenna elements (for example, a plurality of antenna elements forming a MIMO antenna), and is used by the wireless communication interface 912 for transmitting and receiving wireless signals. The smartphone 900 may include a plurality of the antennas 916 as shown in FIG. 14. Note that although FIG. 14 shows an example in which the smartphone 900 includes the plurality of antennas 916, the smartphone 900 may include the single antenna 916.

Moreover, the smartphone 900 may include the antenna 916 provided for each wireless communication system. In that case, the antenna switch 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to one another. The battery 918 supplies electric power to each block of the smartphone 900 shown in FIG. 14 via a feed line partially shown by a broken line in the drawing. For example, the auxiliary controller 919 causes a minimum necessary function of the smartphone 900 to be performed in a sleep mode.

One or more constituent elements (acquisition unit 241 and/or transmission processing unit 243) included in the control unit 240 described with reference to FIG. 10 may be implemented in the wireless communication interface 912 in the smartphone 900 shown in FIG. 14. Alternatively, at least one of these constituent elements may be implemented in the processor 901 or the auxiliary controller 919. As one example, the smartphone 900 may be equipped with a module including a part (for example, the BB processor 913) or all of the wireless communication interface 912, the processor 901, and/or the auxiliary controller 919, so that the one or more constituent elements described above may be implemented in the module. In this case, the above-described module may store a program for causing a processor to function as the one or more constituent elements (in other words, a program for causing the processor to perform the operation of the one or more constituent elements), and may execute the program. As another example, a program for causing a processor to function as the one or more constituent elements may be installed in the smartphone 900, and executed by the wireless communication interface 912 (for example, the BB processor 913), the processor 901, and/or the auxiliary controller 919. As described above, the smartphone 900 or the above-described module may be provided as an apparatus including the one or more constituent elements. In addition, a program for causing a processor to function as the one or more constituent elements may also be provided. Moreover, a readable recording medium on which the above-described program has been recorded may be provided.

Furthermore, for example, the wireless communication unit 220 described with reference to FIG. 10 may be implemented in the wireless communication interface 912 (for example, the RF circuit 914) in the smartphone 900 shown in FIG. 14. In addition, the antenna unit 210 may be implemented on the antenna 916. Furthermore, the storage unit 230 may be implemented in the memory 902.

(Second Application)

Figure 15:
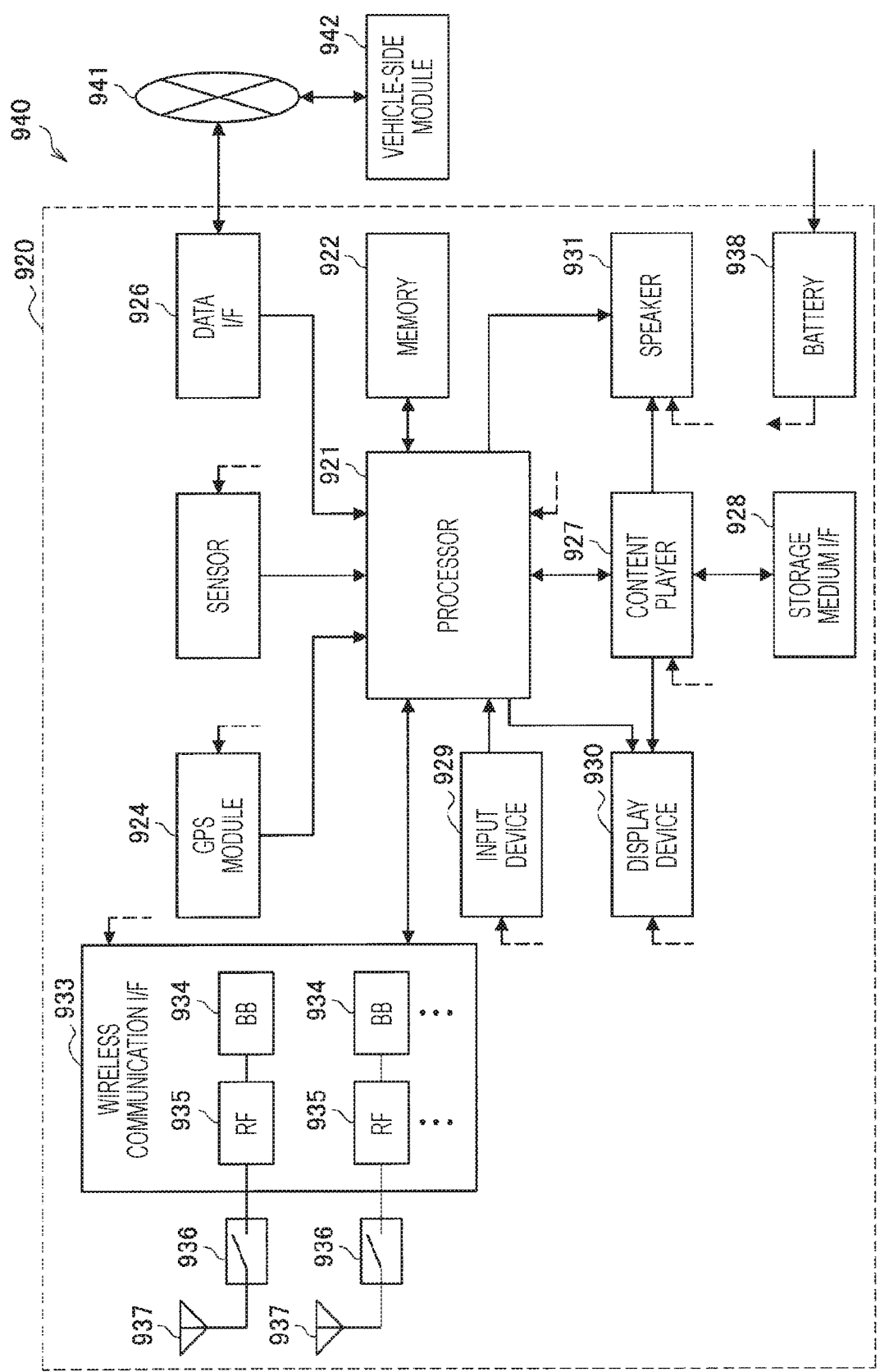
FIG. 15 is a block diagram showing an example of a schematic configuration of a car navigation apparatus.

FIG. 15 is a block diagram showing an example of a schematic configuration of a car navigation apparatus 920 to which the technology according to the present disclosure can be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC. The processor 921 controls a navigation function and other functions of the car navigation apparatus 920. The memory 922 includes a RAM and a ROM, and stores data and a program to be executed by the processor 921.

The GPS module 924 uses GPS signals received from GPS satellites to measure the position (for example, latitude, longitude, and altitude) of the car navigation apparatus 920. The sensor 925 may include, for example, a group of sensors such as a gyro sensor, a geomagnetic sensor, and an atmospheric pressure sensor. The data interface 926 is connected to, for example, an onboard network 941 via a terminal (not shown), and acquires data such as vehicle speed data generated on the vehicle side.

The content player 927 reproduces content stored in a storage medium (for example, CD or DVD) inserted in the storage medium interface 928. The input device 929 includes, for example, a touch sensor for detecting a touch on a screen of the display device 930, a button or switch, and the like, and accepts an operation or information input from a user. The display device 930 includes a screen such as an LCD or an OLED display, and displays a navigation image or an image of the content being reproduced. The speaker 931 outputs navigation sound or sound of the content being reproduced.

The wireless communication interface 933 supports any cellular communication system such as LTE or LTE-Advanced to perform wireless communication. The wireless communication interface 933 may typically include a BB processor 934, an RF circuit 935, and the like. The BB processor 934 may perform, for example, coding/decoding, modulation/demodulation, multiplexing/demultiplexing, and the like. The BB processor 934 performs various signal processing for wireless communication. Meanwhile, the RF circuit 935 may include a mixer, a filter, an amplifier, and the like. The RF circuit 935 transmits and receives wireless signals via the antenna 937. The wireless communication interface 933 may be a one-chip module in which the BB processor 934 and the RF circuit 935 are integrated. The wireless communication interface 933 may include a plurality of the BB processors 934 and a plurality of the RF circuits 935 as shown in FIG. 15. Note that although FIG. 15 shows an example in which the wireless communication interface 933 includes the plurality of BB processors 934 and the plurality of RF circuits 935, the wireless communication interface 933 may include the single BB processor 934 or the single RF circuit 935.

Moreover, in addition to the cellular communication system, the wireless communication interface 933 may support another type of wireless communication system such as a near field communication system, a proximity wireless communication system, or a wireless LAN system. In that case, the wireless communication interface 933 may include the BB processor 934 and the RF circuit 935 for each wireless communication system.

Each of the antenna switches 936 causes a connection destination of the antenna 937 to switch between a plurality of circuits (for example, circuits for different wireless communication systems) included in the wireless communication interface 933.

Each of the antennas 937 includes a single or a plurality of antenna elements (for example, a plurality of antenna elements forming a MIMO antenna), and is used by the wireless communication interface 933 for transmitting and receiving wireless signals. The car navigation apparatus 920 may include a plurality of the antennas 937 as shown in FIG. 15. Note that although FIG. 15 shows an example in which the car navigation apparatus 920 includes the plurality of antennas 937, the car navigation apparatus 920 may include the single antenna 937.

Moreover, the car navigation apparatus 920 may include the antenna 937 provided for each wireless communication system. In that case, the antenna switch 936 may be omitted from the configuration of the car navigation apparatus 920.

The battery 938 supplies electric power to each block of the car navigation apparatus 920 shown in FIG. 15 via a feed line partially shown by a broken line in the drawing. Furthermore, the battery 938 stores electric power supplied from the vehicle side.

One or more constituent elements (acquisition unit 241 and/or transmission processing unit 243) included in the control unit 240 described with reference to FIG. 10 may be implemented in the wireless communication interface 933 in the car navigation apparatus 920 shown in FIG. 15. Alternatively, at least one of these constituent elements may be implemented in the processor 921. As one example, the car navigation apparatus 920 may be equipped with a module including a part (for example, the BB processor 934) or all of the wireless communication interface 933 and/or the processor 921, so that the one or more constituent elements described above may be implemented in the module. In this case, the above-described module may store a program for causing a processor to function as the one or more constituent elements (in other words, a program for causing the processor to perform the operation of the one or more constituent elements), and may execute the program. As another example, a program for causing a processor to function as the one or more constituent elements may be installed in the car navigation apparatus 920, and executed by the wireless communication interface 933 (for example, the BB processor 934) and/or the processor 921. As described above, the car navigation apparatus 920 or the above-described module may be provided as an apparatus including the one or more constituent elements. In addition, a program for causing a processor to function as the one or more constituent elements may also be provided. Moreover, a readable recording medium on which the above-described program has been recorded may be provided.

Furthermore, for example, the wireless communication unit 220 described with reference to FIG. 10 may be implemented in the wireless communication interface 933 (for example, the RF circuit 935) in the car navigation apparatus 920 shown in FIG. 15. In addition, the antenna unit 210 may be implemented on the antenna 937. Furthermore, the storage unit 230 may be implemented in the memory 922.

Moreover, the technology according to the present disclosure may be implemented as an onboard system (or vehicle) 940 including one or more blocks of the car navigation apparatus 920 described above, the onboard network 941, and a vehicle-side module 942. The vehicle-side module 942 generates vehicle-side data such as vehicle speed, engine speed, or failure information, and outputs the generated data to the onboard network 941.

5. Conclusion

The embodiment of the present disclosure has been described above with reference to FIGS. 1 to 15. As described above, the terminal apparatus 20, which performs communication using any of the communication methods classified as V2X communication, acquires information regarding allocation of the first resource pool and the setting information regarding priority use of the first resource pool, and performs a process of packet transmission using the first resource pool on the basis of the acquired information and its own communication method. Thus, it is possible to cause a resource to be preferentially used for communication by an appropriate one of a plurality of terminal apparatuses using different communication methods. Therefore, with regard to, for example, V2V communication and V2P communication, it is possible to cause the first resource pool to be preferentially used by the terminal apparatus 20 that performs V2P communication, by giving a higher priority to V2P communication with a longer transmission cycle.

Although the preferred embodiment of the present disclosure has been described above in detail with reference to the accompanying drawings, the technical scope of the present disclosure is not limited to such an example. It will be apparent to those skilled in the art of the present disclosure that various changes or modifications can be conceived within the scope of the technical idea described in the claims. It is understood that, of course, such changes or modifications are also within the technical scope of the present disclosure.

For example, although an example in which V2P communication is prioritized over V2V communication has been described above regarding sharing of resource pools between V2P communication and V2V communication, the present technology is not limited to such an example V2V communication may be prioritized over V2P communication. Alternatively, priority control may be performed in relation to another communication method classified as V2X communication, such as V2I communication.

Furthermore, the process described by use of the sequence diagram in the present specification need not necessarily be performed in the shown order. Some process steps may be performed in parallel. Moreover, additional process steps may be adopted, and some process steps may be omitted.

In addition, the effects described in the present specification are merely explanatory or illustrative, and not restrictive. That is, the technology according to the present disclosure can achieve other effects obvious to those skilled in the art from the description of the present specification, together with or instead of the above-described effects.

Note that the following configurations are also within the technical scope of the present disclosure.

(1)

A terminal apparatus for performing communication using any of communication methods classified as vehicle to X (V2X) communication, the terminal apparatus including:

an acquisition unit that acquires allocation information regarding allocation of a first resource pool and setting information regarding priority use of the first resource pool, the first resource pool being available to a plurality of terminal apparatuses using the different communication methods classified as V2X communication; and a transmission processing unit that performs a process of packet transmission using the first resource pool on the basis of the communication method of the terminal apparatus itself, the allocation information, and the setting information regarding priority use.

(2)

The terminal apparatus according to (1) above, in which the setting information regarding priority use includes parameters to be set and information indicating setting details of the parameters.

(3)

The terminal apparatus according to (2) above, in which the parameters to be set include information for determining a candidate resource allowed to be actually used or not allowed to be used among the candidate resources judged to be available in a sensing process before transmission of a packet.

(4)

The terminal apparatus according to (3) above, in which the information for determining the candidate resource allowed to be actually used or not allowed to be used includes information indicating rankings of candidate resources allowed to be used or not allowed to be used among a plurality of the ranked candidate resources.

(5)

The terminal apparatus according to any one of (2) to (4) above, in which the parameters to be set include at least any one of a parameter on a resource reselection implementation probability, a parameter on a number of selectable candidate resources, a parameter on a number of resources that can be reserved, a parameter on a priority level to be assigned to a transmission packet, or a parameter on transmission power.

(6)

The terminal apparatus according to any one of (1) to (5) above, in which the setting information regarding priority use includes information indicating the communication method of a terminal apparatus that can preferentially use the first resource pool.

(7)

The terminal apparatus according to any one of (1) to (6) above, in which the allocation information and the setting information regarding priority use are notified by use of Radio Resource Control (RRC) signaling or system information, or set in advance.

(8)

The terminal apparatus according to any one of (1) to (7) above, in which the transmission processing unit adds, to a packet to be transmitted, information indicating the communication method of the terminal apparatus itself.

(9)

The terminal apparatus according to any one of (1) to (8) above, in which the allocation information includes attribute information of the first resource pool.

(10)

The terminal apparatus according to (9) above, in which the attribute information includes information indicating a terminal apparatus that can use the first resource pool.

(11)

The terminal apparatus according to (9) or (10) above, in which the attribute information includes a parameter related to the process of packet transmission, to be used in the first resource pool.

(12)

The terminal apparatus according to (11) above, in which the parameter related to the process of packet transmission includes threshold information for determining whether or not to use the first resource pool, the threshold information being regarding a number of terminal apparatuses for each of the communication methods, a number of transmission packets, a number of packet collisions, a number of detected candidate resources, or detection of the terminal apparatuses for each of the communication methods.

(13)

The terminal apparatus according to (12) above, in which the first resource pool is an area where a second resource pool overlaps with another second resource pool, the second resource pool being available only to a terminal apparatus using a specific one of the communication methods classified as V2X communication.

(14)

The terminal apparatus according to any one of (9) to (13) above, in which the setting information regarding priority use is notified as the attribute information.

(15)

The terminal apparatus according to any one of (9) to (14) above, in which the attribute information is set for each subchannel.

(16)

A base station including:

a control unit that notifies a terminal apparatus that performs communication using any of communication methods classified as V2X communication, of allocation information regarding allocation of a first resource pool and setting information regarding priority use of the first resource pool, the first resource pool being available to a plurality of terminal apparatuses using the different communication methods classified as V2X communication.

(17)

A method to be performed by a terminal apparatus that performs communication using any of communication methods classified as V2X communication, the method including:

acquiring allocation information regarding allocation of a first resource pool and setting information regarding priority use of the first resource pool, the first resource pool being available to a plurality of terminal apparatuses using the different communication methods classified as V2X communication; and performing a process of packet transmission using the first resource pool on the basis of the communication method of the terminal apparatus itself, the allocation information, and the setting information regarding priority use.

(18)

A method including:

notifying, by use of a processor, a terminal apparatus that performs communication using any of communication methods classified as V2X communication, of allocation information regarding allocation of a first resource pool and setting information regarding priority use of the first resource pool, the first resource pool being available to a plurality of terminal apparatuses using the different communication methods classified as V2X communication.

(19)

A recording medium on which a program has been recorded, the program causing a computer of a terminal apparatus that performs communication using any of communication methods classified as V2X communication to function as:

an acquisition unit that acquires allocation information regarding allocation of a first resource pool and setting information regarding priority use of the first resource pool, the first resource pool being available to a plurality of terminal apparatuses using the different communication methods classified as V2X communication; and a transmission processing unit that performs a process of packet transmission using the first resource pool on the basis of the communication method of the terminal apparatus itself, the allocation information, and the setting information regarding priority use.

(20)

A recording medium on which a program has been recorded, the program causing a computer to function as:

a control unit that notifies a terminal apparatus that performs communication using any of communication methods classified as V2X communication, of allocation information regarding allocation of a first resource pool and setting information regarding priority use of the first resource pool, the first resource pool being available to a plurality of terminal apparatuses using the different communication methods classified as V2X communication.

REFERENCE SIGNS LIST

1 System
10 Base station, RSU
110 Antenna unit
120 Wireless communication unit
130 Network communication unit
140 Storage unit
150 Control unit
151 Priority control unit
151 Allocation unit
153 Priority control unit
20 Terminal apparatus, VUE, PUE
210 Antenna unit
220 Wireless communication unit
230 Storage unit
240 Control unit
241 Acquisition unit
243 Transmission processing unit

The invention claimed is:

1. A terminal apparatus, comprising:
an acquisition unit configured to acquire allocation information associated with allocation of a first resource pool and setting information associated with priority use of the first resource pool; and
a transmission processing unit configured to:
transmit, by the first resource pool, a packet based on the allocation information and the setting information; and
transmit, by the first resource pool, the packet based on a first communication method of the terminal apparatus, wherein
the first resource pool is available to a plurality of terminal apparatuses using a plurality of different communication methods classified as vehicle to X (V2X) communication, and
the plurality of different communication methods comprises the first communication method and the plurality of terminal apparatuses comprises the terminal apparatus.

2. The terminal apparatus according to claim 1, wherein the setting information includes parameters to be set and first information that indicates setting details of the parameters.

3. The terminal apparatus according to claim 2, wherein the parameters include second information associated with a determination of a candidate resource that is allowed to be used or not allowed to be used among a plurality of candidate resources to be available in a sensing process before the transmission of the packet.

4. The terminal apparatus according to claim 3, wherein the second information indicates rankings of the plurality of candidate resources allowed to be used or not allowed to be used among a plurality of ranked candidate resources.

5. The terminal apparatus according to claim 2, wherein the parameters include at least one of a parameter on a resource reselection implementation probability, a parameter on a number of selectable candidate resources, a parameter on a number of resources that can be reserved, a parameter on a priority level to be assigned to the packet, or a parameter on transmission power.

6. The terminal apparatus according to claim 1, wherein the setting information includes information that indicates the first communication method of the terminal apparatus that preferentially uses the first resource pool.

7. The terminal apparatus according to claim 1, wherein the allocation information and the setting information are one of notified by use of Radio Resource Control (RRC) signaling or system information, or set in advance.

8. The terminal apparatus according to claim 1, wherein the transmission processing unit is further configured to add, to the packet to be transmitted, information that indicates the first communication method of the terminal apparatus.

9. The terminal apparatus according to claim 1, wherein the allocation information includes attribute information of the first resource pool.

10. The terminal apparatus according to claim 9, wherein the attribute information includes information that indicates the terminal apparatus that uses the first resource pool.

11. The terminal apparatus according to claim 9, wherein the attribute information includes a parameter associated with the transmission of the packet, to be used in the first resource pool.

12. The terminal apparatus according to claim 11, wherein the parameter includes threshold information associated with a determination of whether or not to use the first resource pool, and the threshold information regards at least one of a number of the plurality of terminal apparatuses for each of the plurality of different communication methods, a number of transmission packets, a number of packet collisions, a number of detected candidate resources, or detection of the plurality of terminal apparatuses for each of the plurality of different communication methods.

13. The terminal apparatus according to claim 12, wherein the first resource pool is an area where a second resource pool overlaps with a third resource pool, and
the second resource pool is available only to the terminal apparatus based on one of the plurality of different communication methods classified as the V2X communication.

14. The terminal apparatus according to claim 9, wherein the setting information is notified as the attribute information.

15. The terminal apparatus according to claim 9, wherein the attribute information is set for each subchannel.

16. A base station, comprising:
a control unit configured to notify a terminal apparatus that performs communication using one of a plurality of different communication methods classified as vehicle to X (V2X) communication, of allocation information associated with allocation of a first resource pool and setting information associated with priority use of the first resource pool, wherein
the terminal apparatus transmits, by the first resource pool, a packet based on the allocation information and the setting information,
the terminal apparatus transmits, by the first resource pool, the packet based on a first communication method of the terminal apparatus, and
the first resource pool is available to a plurality of terminal apparatuses using the plurality of different communication methods classified as the V2X communication.

17. A method, comprising:
in a terminal apparatus:
acquiring allocation information associated with allocation of a first resource pool and setting information associated with priority use of the first resource pool;
transmitting, by the first resource pool, a packet based on the allocation information, and the setting information; and
transmitting, by first resource pool, the packet based on a first communication method of the terminal apparatus, wherein
the first resource pool is available to a plurality of terminal apparatuses using a plurality of different communication methods classified as vehicle to X (V2X) communication, and
the plurality of different communication methods comprises the first communication method and the plurality of terminal apparatuses comprises the terminal apparatus.

18. A method, comprising:
notifying, by use of a processor, a terminal apparatus that performs communication using one of a plurality of different communication methods classified as vehicle to X (V2X) communication, of allocation information associated with allocation of a first resource pool and setting information associated with priority use of the first resource pool, wherein
the terminal apparatus transmits, by the first resource pool, a packet based on the allocation information and the setting information,
the terminal apparatus transmits, by the first resource pool, the packet based on a first communication method of the terminal apparatus, and
the first resource pool is available to a plurality of terminal apparatuses using the plurality of different communication methods classified as the V2X communication.

19. A non-transitory computer-readable medium having stored thereon, computer-executable instructions, which when executed by a terminal apparatus, cause the terminal apparatus to execute operations, the operations comprising:
acquiring allocation information associated with allocation of a first resource pool and setting information associated with priority use of the first resource pool;
transmitting, by the first resource pool, a packet based on, the allocation information, and the setting information; and
transmitting, by the first resource pool, the packet based on a first communication method of the terminal apparatus, wherein
the first resource pool is available to a plurality of terminal apparatuses using a plurality of different communication methods classified as vehicle to X (V2X) communication, and
the plurality of different communication methods comprises the first communication method and the plurality of terminal apparatuses comprises the terminal apparatus.

20. A non-transitory computer-readable medium having stored thereon, computer-executable instructions, which when executed by a terminal apparatus, cause the terminal apparatus to execute operations, the operations comprising:
notifying the terminal apparatus that performs communication using one of a plurality of different communication methods classified as vehicle to X (V2X) communication, of allocation information associated with allocation of a first resource pool and setting information associated with priority use of the first resource pool, wherein
the terminal apparatus transmits, by the first resource pool, a packet based on the allocation information and the setting information,
the terminal apparatus transmits, by the first resource pool, the packet based on a first communication method of the terminal apparatus, and
the first resource pool is available to a plurality of terminal apparatuses using the plurality of different communication methods classified as the V2X communication.

* * * * *